United States Patent
Nakamura et al.

(10) Patent No.: US 9,802,644 B2
(45) Date of Patent: Oct. 31, 2017

(54) ELECTRONIC POWER STEERING APPARATUS

(75) Inventors: Kouji Nakamura, Saitama (JP); Kazuhiko Inaba, Saitama (JP); Shigenobu Sekiya, Saitama (JP); Tomohiro Morikami, Saitama (JP); Junichi Seto, Saitama (JP); Satoshi Kawabe, Saitama (JP); Norio Yamazaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 380 days.

(21) Appl. No.: 13/990,346

(22) PCT Filed: Nov. 22, 2011

(86) PCT No.: PCT/JP2011/076909
§ 371 (c)(1),
(2), (4) Date: Oct. 3, 2013

(87) PCT Pub. No.: WO2012/073760
PCT Pub. Date: Jun. 7, 2012

(65) Prior Publication Data
US 2014/0019008 A1     Jan. 16, 2014

(30) Foreign Application Priority Data
Nov. 29, 2010 (JP) .................. 2010-265589

(51) Int. Cl.
*B62D 6/00*     (2006.01)
*B62D 5/04*     (2006.01)

(52) U.S. Cl.
CPC ............. *B62D 6/00* (2013.01); *B62D 5/0463* (2013.01); *B62D 6/008* (2013.01)

(58) Field of Classification Search
None
See application file for complete search history.

(56) References Cited

U.S. PATENT DOCUMENTS 5,198,981 A *   3/1993   Collier-Hallman .. B62D 5/0463
                                                    180/446
5,398,953 A     3/1995   Shimizu
(Continued)

FOREIGN PATENT DOCUMENTS

CN     101568460 A     10/2009
EP       1942044 A1     7/2008
(Continued)

OTHER PUBLICATIONS

Extended European search report dated Oct. 9, 2014 issued in corresponding EP Patent Application No. 11844801.8.
(Continued)

*Primary Examiner* — Rami Khatib
*Assistant Examiner* — Nicholas K Wiltey
(74) *Attorney, Agent, or Firm* — Carrier Blackman & Associates, P.C.; Joseph P. Carrier; Jeffrey T. Gedeon

(57) ABSTRACT

An electronic power steering apparatus for a vehicle having a steering mechanism to generate a steering assisting force includes: a steering angle sensor; a steering torque sensor; a target steering torque setting unit for setting a target steering torque based on the detected steering angle; a torque deviation computing unit for computing a torque deviation between the target steering torque and the detected steering torque; a first target current value computing unit for computing a first target current value for generating a steering assisting force by the motor based on the computed torque deviation; and a vehicle speed sensitivity adjusting unit that adjusts the first target current value, at least corresponding to a detected vehicle speed, and outputs the adjusted first current value as a second target current value. The motor control unit controls the motor to generate the steering assisting force based on the second target current value.

9 Claims, 11 Drawing Sheets

(56) References Cited

U.S. PATENT DOCUMENTS

| | | | |
|---|---|---|---|
| 5,878,360 A * | 3/1999 | Nishino | B62D 5/0466 |
| | | | 180/446 |
| 7,881,841 B2 | 2/2011 | Dattilo et al. | |
| 8,249,778 B2 | 8/2012 | Held et al. | |
| 9,499,196 B2 * | 11/2016 | Svensson | B62D 5/0472 |
| 2004/0140148 A1 * | 7/2004 | Nishizaki | B62D 5/0463 |
| | | | 180/443 |
| 2006/0064214 A1 * | 3/2006 | Takimoto | B62D 6/008 |
| | | | 701/41 |
| 2006/0096800 A1 * | 5/2006 | Saibold | B62D 7/09 |
| | | | 180/434 |
| 2008/0196966 A1 * | 8/2008 | Maruyama | B62D 5/0481 |
| | | | 180/446 |
| 2009/0271069 A1 | 10/2009 | Yamamoto et al. | |
| 2010/0228440 A1 * | 9/2010 | Yamazaki | B62D 6/008 |
| | | | 701/41 |

FOREIGN PATENT DOCUMENTS

| | | |
|---|---|---|
| EP | 2096018 A1 | 9/2009 |
| JP | 06-056046 A | 3/1994 |
| JP | 2000-177615 A | 6/2000 |
| JP | 2000-264240 A | 9/2000 |
| JP | 2002-059855 A | 2/2002 |
| JP | 2002-059855 A | 2/2002 |
| JP | 2004-90834 A | 3/2004 |
| JP | 2007-99053 A | 4/2007 |
| JP | 2008-298551 A | 12/2008 |

OTHER PUBLICATIONS

Chinese Office Action dated Sep. 28, 2014 issued in the corresponding CN Patent Application 201180057348.9.

International Search Report, PCT/JP2011/076909 dated Feb. 21, 2013.

* cited by examiner

ELECTRONIC POWER STEERING APPARATUS

CROSS-REFERENCE TO RELATED APPLICATIONS

This application is a National Stage entry of International Application No. PCT/JP2011/076909, filed Nov. 22, 2011, which claims priority to Japanese No. 2010-265589, filed Nov. 29, 2010. The disclosures of the prior applications are hereby incorporated in their entirety by reference.

TECHNICAL FIELD

The present invention relates to an electronic power steering apparatus, and particularly relates to an electronic power steering apparatus applied to a vehicle provided with a steering mechanism with an Ackermann ratio lower than an ideal ratio.

BACKGROUND ART

In an electronic power steering apparatus, an electric machine (motor) generates a steering assisting force corresponding to the magnitude of a steering torque, and this steering assisting force is transmitted to a steering system so as to reduce a steering force in steering by a driver. Disclosed is a technology for controlling an electric machine, wherein a base current (assist torque) defined by a steering torque and a vehicle speed is compensated by the inertial of a steering system and adjusted by the damper (viscosity) of the steering system, and the current compensated by the inertial and adjusted by the damper is taken as a target current (see Patent Documents 1 and 2).

Incidentally, only torque sensor output is input to an inertial compensating current value determining means disclosed in Patent Document 2, and a vehicle speed signal is not input.

In Patent Document 3, disclosed is a technology, wherein, in order to solve the problem that a self-aligning torque applied to the steering wheel by wheels and a steering mechanism is small and the returning force of the steering wheel is weak and control of the steering wheel by the driver tends to be destabilized by irregularity, rolling, or the like of a road surface, as a solution, an electronic power steering apparatus controls such as to generate a steering assisting force, based on the deviation between a preset target steering torque for a steering angle detected by a steering angle detection sensor and an actual steering torque detected by steering torque sensor.

Further, it is shown in FIG. 8 of Patent Document 4 that, regarding steering angle vs. steering torque characteristic of a vehicle adopting a steering geometry with characteristics similar to those of a parallel geometry, when the steering angle is small, the steering torque becomes larger as the steering angle increases, and the steering torque becomes smaller as the steering angle subsequently becomes larger. This is a factor that gives a feeling of strangeness to a driver. FIG. 9 of Patent Document 4 shows steering angle vs. steering torque characteristic with an ideal Ackermann geometry, wherein the steering torque increases linearly in proportion to the steering angle.

With a vehicle designed with a parallel geometry in such a manner, as the transverse sliding angle of a turning inner wheel turns to the opposite direction, when the self-aligning torque turns to the divergence side and the steering angle becomes large, the steering torque becomes small, which gives a driver a feeling of strangeness such that control of the steering wheel by the driver is destabilized.

As a solution in this situation, Patent Document 4 discloses a technology for adjusting steering feeling corresponding to the steering angle by a steering wheel returning control function, wherein a control device of an electronic power steering apparatus includes a steeling angle sensor for detecting a steering angle, a steering torque sensor for detecting a steering torque, a vehicle speed detecting means for detecting a vehicle speed, and a control means for controlling an electric machine, based on the steering angle, the steering angular speed of the steering angle, the steering torque, and the vehicle speed, and wherein the control means has the steering wheel returning control function to control returning of the steering wheel.

BACKGROUND ART DOCUMENTS

Patent Documents

Patent Document 1: JP 2002-59855 A (FIG. 2)
Patent Document 2: JP 2000-177615 A (FIG. 2)
Patent Document 3: JP H06-56046 (FIG. 1)
Patent Document 4: JP 2007-99053 (FIG. 1 to FIG. 5)

DISCLOSURE OF THE INVENTION

Problems to be Solved by the Invention

However, in the technology disclosed by Patent Document 4, in the steering wheel returning control, as described in FIG. 2 and paragraph [0027] of Patent Document 4, a steering wheel returning basic current value is output by a certain function corresponding to a steering angle; the value is multiplied by a steering angular velocity sensitive gain that damps the more, corresponding to the steering angular velocity, the larger the steering angular velocity is, and a vehicle speed sensitive gain that damps the more, corresponding to the vehicle speed, the higher the vehicle speed is; and a target current for setting a steering assisting force is thus adjusted.

As a result, it is necessary to set, corresponding to the characteristics of a vehicle, the certain function to set a steering wheel returning basic current value, wherein the steering wheel returning basic current value is set by the certain function, corresponding to a steering angle. Accordingly, it is necessary to repeat setting the certain function, based on simulation computation or experiment, each time of design modification of a vehicle. Further, in FIG. 2 of Patent Document 4, the value of the vehicle speed sensitive gain is set to 1 with a vehicle speed of zero. Accordingly, as a result, in stationary steering operation of the steering wheel, the steering force for a driver to perform steering operation increases on the contrary.

An object of the present invention is to provide an electronic power steering apparatus that is applied to a vehicle provided with a steering mechanism with an Ackermann ratio lower than an ideal ratio and solves the above-described conventional problems, wherein the electronic power steering apparatus does not give a driver feeling of strangeness, by making the steering angle vs. steering reaction force characteristic in a case of a low vehicle speed close to the characteristic of ideal Ackermann.

Means for Solving the Problems

An electronic power steering apparatus according to a first aspect of this disclosure that is applied to a vehicle having a steering mechanism with an Ackermann ratio lower than an ideal Ackermann ratio, causes motor control means to control a motor to generate a steering assisting force, and transmits the steering assisting force to a steering system to cause a reduction in a steering force, comprises: a steering angle sensor for detecting a steering angle of a steering wheel;

a steering torque sensor for detecting a steering torque of the steering wheel;

target steering torque setting means for setting a target steering torque on the basis of the steering angle detected by the steering angle sensor;

torque deviation computing means for computing a torque deviation between the target steering torque set by the target steering torque setting means and the steering torque detected by the steering torque sensor; and first target current value computing means for computing a first target current value for generating a steering assisting force by the motor on the basis of the torque deviation computed by the torque deviation computing means, wherein the motor control means controls the motor to generate the steering assisting force on the basis of the first target current value.

The electronic power steering apparatus according to a second aspect of this disclosure is characterized, in the invention of claim 1, in that the steering mechanism with an Ackermann ratio lower than an ideal Ackermann ratio which is close to a steering apparatus with such a substantially parallel geometry that, in a state that the steering assisting force is not applied to the steering system, a steering reaction force for causing a driver to feel the steering reaction from the steering wheel is saturated or reduced when the steering angle becomes large in a low vehicle speed region.

According to the first and second aspect of this disclosure, on a vehicle having the steering mechanism with an Ackermann ratio lower than an ideal Ackermann ratio, even though the steering mechanism has a substantially parallel geometry such that a steering reaction force is saturated or reduced when the steering angle becomes large on the left or right side in a low vehicle speed region, the electronic power steering apparatus includes the torque deviation computing means for computing a torque deviation between a target steering torque set by the target steering torque setting means and a steering torque detected by the steering torque sensor, and the first target current value computing means for computing a first target current value for generating a steering assisting force by the motor, based on the torque deviation computed by the torque deviation computing means, wherein the motor control means controls the motor to generate a steering assisting force, based on the first target current value. Accordingly, when the steering angle is made larger than or equal to a certain value on the left or right side, the first target current value is computed, based on the torque deviation between a target steering torque and a steering torque. Thus, painstaking work such as resetting data, for testing or the like, for computing the first target current value by the first target current value computing means, each time the vehicle body design or the capacity of the motor is different, is unnecessary.

Further, as the first target current value is computed, based on a torque deviation, for example, even in a case that the steering torque is low on a low μ road surface, the first target current value is finally out put such as to give a steering reaction force. Thus, without a feeling of strangeness, the driver can have a steering feeling in a region of steering angle larger than or equal to a certain steering angle on the left or right side, in a low vehicle speed running state on a low □ road surface, for example an ice covered road surface.

The electronic power steering apparatus according to a third aspect of this disclosure in addition to the first aspect of this disclosure, further comprises:

vehicle speed sensitivity adjusting means that adjusts the first target current value in accordance with, at least, a vehicle speed detected by vehicle speed detecting means, and outputs the adjusted first target current value as a second target current value, wherein the motor control means controls the motor to generate the steering assisting force on the basis of the second target current value instead of the first target current value.

According to the third aspect of this disclosure, the electronic power steering apparatus includes the vehicle speed sensitivity adjusting means that adjusts the first target current value, corresponding to a vehicle speed, and outputs the adjusted first target current value as a second target current value, wherein the motor control means controls the motor to generate the steering assisting force, based on the second target current value. As a result, similarly to a case of a vehicle having a steering mechanism with a high Ackermann ratio, even on a vehicle having a steering mechanism with a low Ackermann ratio, it is possible to stably give the driver a steering feeling, even in the low vehicle speed region, by the second target current value output from the vehicle speed sensitivity adjusting means, such that the more the steering angle increases on the left or right side, the more the steering reaction force increases by a self-aligning torque.

In the medium-high vehicle speed region, even on a vehicle having a steering mechanism with a low Ackermann ratio, a self-aligning torque is sufficiently generated with a steering angle larger than or equal to a certain value on the left or right side, and a steering reaction force is applied to the steering wheel. Accordingly, the driver does not have a feeling of strangeness even if the vehicle speed sensitivity adjusting means continuously decreases the second target current value and finally decreases down to 0 (zero), corresponding to the increase in the vehicle speed.

The electronic power steering apparatus according to a fourth aspect of this disclosure, in addition to the first aspect of this disclosure further comprises:

steering angle sensitivity adjusting means that adjusts the first target current value in accordance with, at least, the steering angle detected by the steering angle sensor, and outputs the adjusted first target current value as a third target current value, wherein the motor control means controls the motor to generate the steering assisting force on the basis of the third target current value instead of the first target current value.

According to the fourth aspect of this disclosure, the electronic power steering apparatus includes the steering angle sensitivity adjusting means that adjusts the first target current value in accordance with the steering angle detected by the steering angle sensor, and outputs the adjusted first target current value as a third target current value, wherein the motor control means controls the motor to generate the steering assisting force on the basis of the third target current value.

It is possible to set such that a third target current value is not output at least unless the steering angle exceeds a predetermined value on the left or right side. Accordingly, even in a low vehicle speed state of a vehicle having a steering mechanism with a low Ackermann ratio, the third target current value is 0 in a steering angle range where the steering angle vs. steering torque characteristic is the same as the steering angle vs. steering torque characteristic of a vehicle having a steering mechanism with a high Ackermann ratio, and accordingly, a steering reaction force from the motor can be effectively obtained in a state that the steering angle is exceeding the predetermined value on the left or right side.

Further, within the predetermined value range of the steering angle on the left or right side, the driver can feel road surface information from the steered wheels (front wheels) by a change in the steering reaction force.

The electronic power steering apparatus according to a fifth aspect of this disclosure, in addition to the third aspect of this disclosure, steering angle sensitivity adjusting means that adjusts the second target current value in accordance with, at least, the steering angle detected by the steering angle sensor to output the adjusted second target current value as a third target current value, wherein the motor control means controls the motor to generate the steering assisting force on the basis of the third target current value instead of the second target current value.

According to the fifth aspect of this disclosure, the electronic power steering apparatus includes steering angle sensitivity adjusting means that adjusts the second target current value in accordance with, at least, the steering angle detected by the steering angle sensor, and outputs the adjusted second target current value as a third target current value, wherein the motor control means controls the motor to generate the steering assisting force, based on the third target current value.

It is possible to set such that a third target current value is not output at least unless the steering angle exceeds a predetermined value on the left or right side. Accordingly, even in a low vehicle speed state of a vehicle having a steering mechanism with a low Ackermann ratio, the third target current value is 0 in a steering angle range where the steering angle vs. steering torque characteristic is the same as the steering angle vs. steering torque characteristic of a vehicle having a steering mechanism with a high Ackermann ratio, and accordingly, a steering reaction force from the motor can be effectively obtained in a state that the steering angle is exceeding the predetermined value on the left or right side.

Further, within the predetermined value range of the steering angle on the left or right side, the driver can feel road surface information from the steered wheels (front wheels) by a change in the steering reaction force.

The electronic power steering apparatus according to a sixth aspect of this disclosure, in addition to the first aspect of this disclosure, further comprises:

second target current value computing means for computing a fourth target current value for generating the steering assisting force in accordance with, at least, the steering torque detected by the steering torque sensor; and adding means that adds the first target current value to the fourth target current value to output a fifth target current value, wherein the motor control means controls the motor to generate the steering assisting force on the basis of the fifth target current value instead of the first target current value.

According to the sixth aspect of this disclosure, the fourth target current value is input to the adding means, and based on the fifth target current value as a result of adding computation of adding the fourth target current value to the first target current value, the motor control means controls the motor to generate the steering assisting force. As a result, the steering angle vs. steering torque characteristic is adjusted by the adding means, and the first target current value with this adjustment is output as the fifth target current value to be used for control of the steering assisting force output from the electric motor, wherein the above-described steering angle vs. steering torque characteristic is specific to a vehicle adopting a steering mechanism with a low Ackermann ratio and includes saturation or, in reverse, drop of the steering reaction force that occurs when the steering angle becomes large on the left or right side, exceeding a certain value in a low vehicle speed region.

As a result, for example, even on a vehicle having a steering mechanism with a low Ackermann ratio, it is possible to stably give the driver a feeling of steering similar to that of a vehicle adopting a steering mechanism with a high Ackermann ratio, even in a low vehicle speed region, such that the more the steering angle increases on the left or right side, the more a steering reaction force increases by self-aligning.

The electronic power steering apparatus according to a seventh aspect of this disclosure, in addition to the third aspect of this disclosure, further comprises:

second target current value computing means for computing a fourth target current value for generating the steering assisting force in accordance with the steering torque detected by the steering torque sensor; and adding means that adds the second target current value to the fourth target current value to output a result of the addition as a fifth target current value, wherein the motor control means controls the motor to generate the steering assisting force on the basis of the fifth target current value instead of the second target current value.

According to the seventh aspect of this disclosure, the fourth target current value is input to the adding means, and the motor control means controls the motor to generate the steering assisting force, based on the fifth target current value that is a result of adding computation of adding the fourth target current value to the above-described second current value. As a result, the steering angle vs. steering torque characteristic is adjusted by the adding means, and the fourth target current value with this adjustment is output as the fifth target current value to be used for control of the steering assisting force output from the electric motor, wherein the steering angle vs. steering torque characteristic is specific to a vehicle adopting a steering mechanism with a low Ackermann ratio and includes saturation or, in reverse, drop of the steering reaction force that occurs when the steering angle becomes large on the left or right side, exceeding a certain value in a low vehicle speed region.

As a result, for example, even on a vehicle having a steering mechanism with a low Ackermann ratio, it is possible to stably give the driver a feeling of steering similar to that of a vehicle adopting a steering mechanism with a high Ackermann ratio, even in a low vehicle speed region, such that the more the steering angle increases on the left or right side, the more a steering reaction force increases by self-aligning torque.

According to an eighth and ninth aspect of this disclosure, an electronic power steering apparatus, further comprises, in addition to the fourth and fifth aspect of this disclosure:

second target current value computing means for computing a fourth target current value for generating the steering assisting force in accordance with, at least, the steering torque detected by the steering torque sensor; and adding means that adds the third target current value to the fourth target current value to output a fifth target current value, wherein the motor control means controls the motor to generate the steering assisting force on the basis of the fifth target current value instead of the third target current value.

According to the eighth and ninth aspects of this disclosure, the fourth target current value is input to the adding means, and the motor control means controls the motor to generate the steering assisting force, based on the fifth target current value that is a result of adding computation of adding the fourth target current value to the above-described third current value. As a result, the steering angle vs. steering torque characteristic is adjusted by the adding means, and the fourth target current value with this adjustment is output as the fifth target current value to be used for control of the steering assisting force output from the electric motor, wherein the steering angle vs. steering torque characteristic is specific to a vehicle adopting a steering mechanism with a low Ackermann ratio and includes saturation or, in reverse, drop of the steering reaction force that occurs when the steering angle becomes large on the left or right side, exceeding a certain value in a low vehicle speed region.

As a result, for example, even on a vehicle having a steering mechanism with a low Ackermann ratio, it is possible to stably give the driver a feeling of steering similar to that of a vehicle adopting a steering mechanism with a high Ackermann ratio, even in a low vehicle speed region, such that the more the steering angle increases on the left or right side, the more a steering reaction force increases by self-aligning torque.

The electronic power steering apparatus according to a tenth aspect of this disclosure, in addition to the first aspect of this disclosure, further comprises:

variation width reducing means for damping vibration variation width of the first target current value.

The electronic power steering apparatus according to an eleventh aspect of this disclosure, includes the tenth aspect of this disclosure,
wherein the variation width reducing means comprises:
steering angular velocity computing means for computing a steering angular velocity by temporally differentiating the steering angle detected by the steering angle sensor;
target steering angular velocity computing means for computing a target steering singular velocity in accordance with, at least, the steering angle detected by the steering angle sensor;
steering angular velocity deviation computing means for computing a steering angular velocity deviation between the target steering angular velocity computed by the target steering angular velocity computing means and the steering angular velocity computed by the steering angular velocity computing means;
third target current value computing means for computing a sixth target current value on the basis of the computed steering angular velocity deviation; and
damp adding means that performs damping processing of the vibration variation width by adding the sixth target current value to the first target current value, and inputs a result of the damping processing to the adding means.

The electronic power steering apparatus according to a twelfth aspect of this disclosure includes the tenth aspect of this disclosure,
wherein the variation width reducing means performs damping processing of the vibration variation width by performing filtering processing of the first target current value with a certain time constant.

According to the tenth, eleventh, and twelfth aspects of this disclosure, as the vibration variation width of the first target current value can be damped by the variation width reducing means, it is possible to stably control the steering assisting force output from the motor without temporarily vibrate the steering assisting force.

Advantage of the Invention

According to the present invention, it is possible to provide an electronic power steering apparatus, which is applied to a vehicle provided with a steering mechanism with an Ackermann ratio lower than an ideal ratio, wherein the electronic power steering apparatus does not give a feeling of strangeness, by making steering angle vs. steering reaction force characteristic at low vehicle speed close to the ideal Ackermann characteristic.

BRIEF DESCRIPTION OF THE DRAWINGS

FIGS. 7A and 7B illustrates operations in the first embodiment, wherein FIG. 7A illustrates temporal transition of steering angle in returning operation to a neutral point and FIG. 7B illustrates temporal transition of steering reaction force in the returning operation to the neutral point;

EMBODIMENTS FOR CARRYING OUT THE INVENTION

Ackerman Ratio and Steering Angle vs. Steering Torque Characteristic

First, referring to FIGS. 11 and 12, description will be made on a steering mechanism with an ideal Ackermann geometry and a steering mechanism with an Ackermann ratio lower than an ideal ratio, and steering angle vs. steering torque characteristic, corresponding to the value of Ackerman ratio, during low vehicle speed driving, which are in a steering mechanism related to the present invention.

Figure 11:
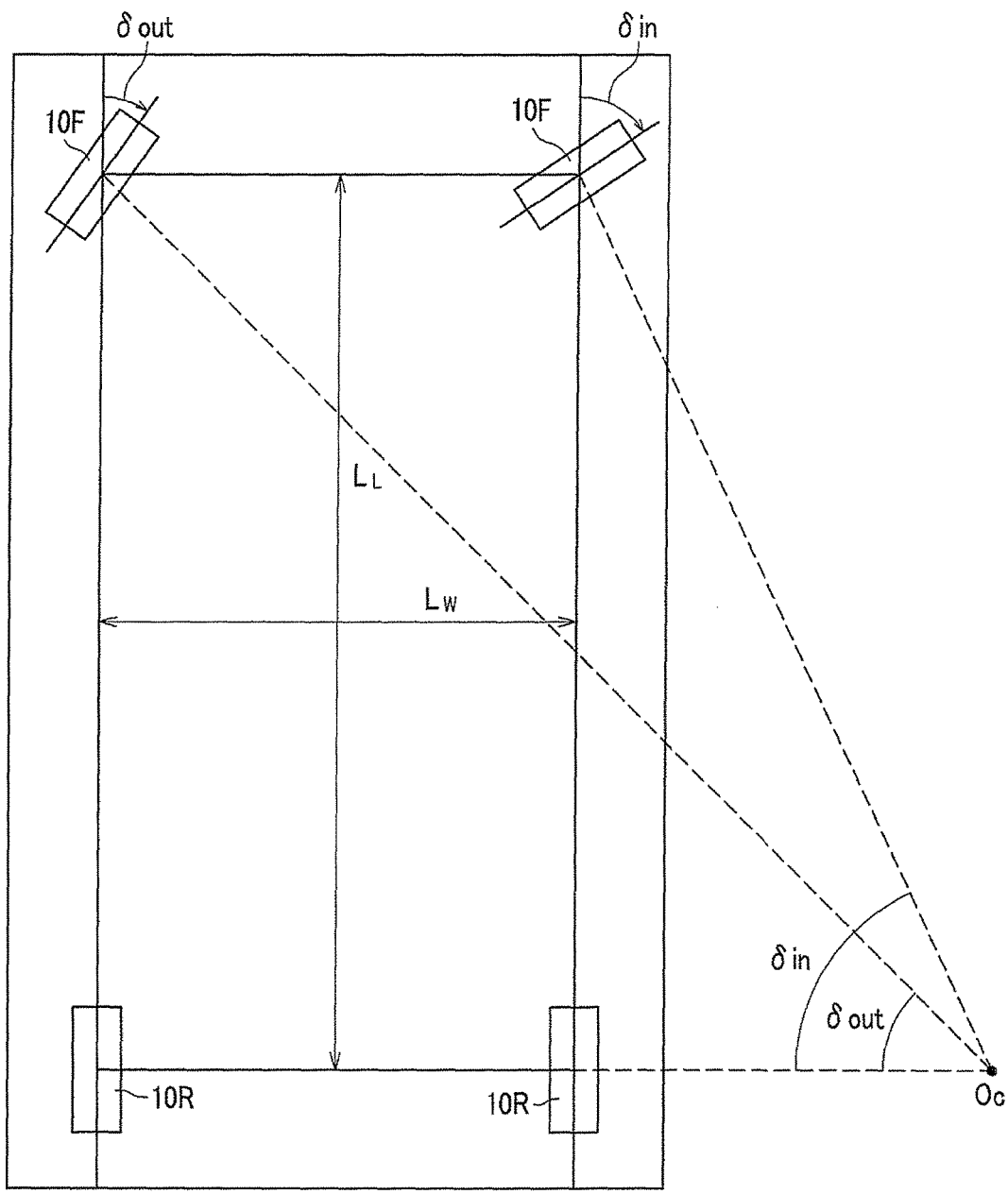
FIG. 11 illustrates an ideal Ackermann geometry.
Figure 12A:
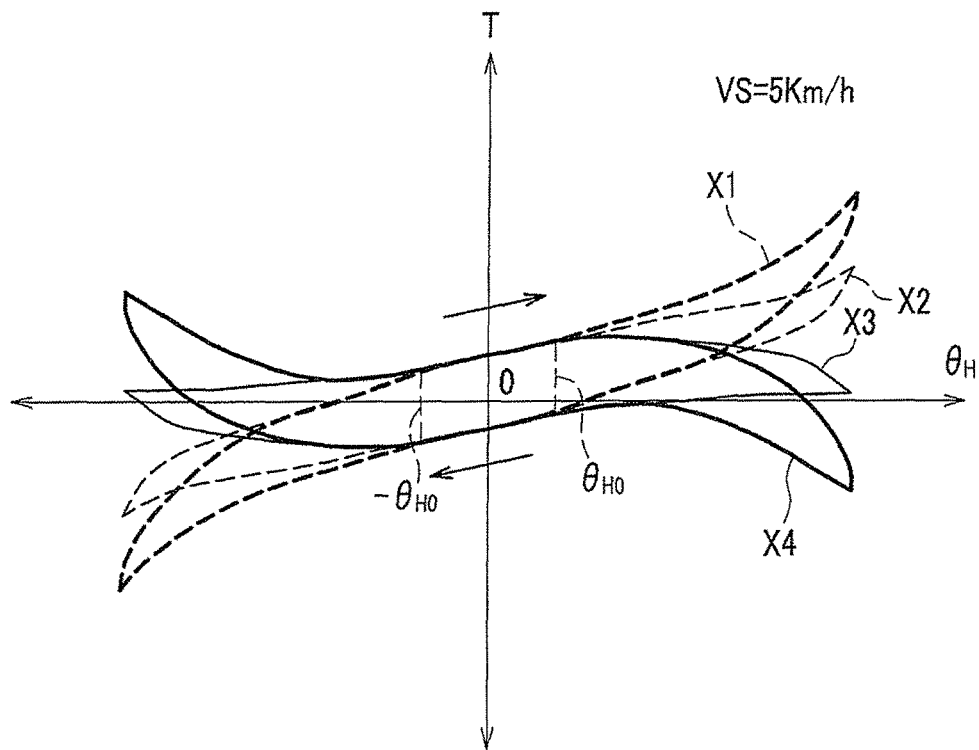
FIG. 12A illustrates an example of variation in steering angle vs. steering torque characteristic corresponding to Ackermann ratio at low vehicle speed

FIG. 11 illustrates an ideal Ackermann geometry. FIG. 12A illustrates an example of variation in steering angle vs. steering torque characteristic corresponding to Ackermann ratio at low vehicle speed and FIG. 12B illustrates an example of variation in steering angle vs. steering torque characteristic corresponding to Ackermann ratio at medium or high vehicle speed.

Figure 12B:
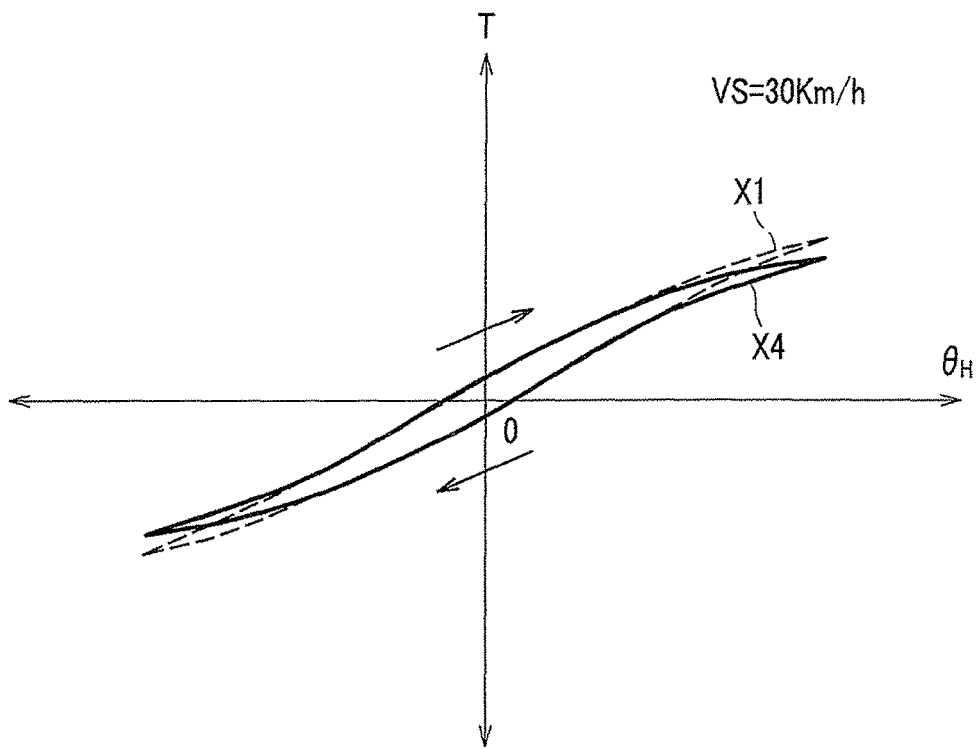
FIG. 12B illustrates an example of variation in steering angle vs. steering torque characteristic corresponding to Ackermann ratio at medium or high vehicle speed.

In order to make a smooth turn at a low vehicle speed without causing slip angle of four wheels 10F, 10F, 10R, and 10R, if the inner wheel turning angle δin of the steered wheels (front wheels) 10F, 10F is larger than the outer wheel turning angle δout and inner-outer wheel turning angle characteristic is such as shown in FIGS. 12A and 12B, a turn around a center Oc can be made.

Further, the maximum inner turning angle $\delta in_{max}$, and the maximum outer wheel turning angle $\delta out_{max}$ required for a turn with the minimum radius are determined corresponding to the wheel base (the distance $L_L$ between front and rear axles) and the tread (the width $L_W$ between the left and right wheels).

Herein, the above-described Ackermann ratio is defined by the following Equation (1) from the maximum inner turning angle $\delta in_{max}$, which is required for a turn with the minimum radius with the ideal Ackermann geometry and occurs with a full steering to either the left or the right, and the maximum inner wheel turning angle $\delta in^*_{max}$ and the maximum outer wheel turning angle $\delta out^*_{max}$ in the steering mechanism by an actual designing with an Ackerman ratio lower than an ideal ratio.

$$\text{Ackermann ratio (\%)} = \frac{\delta in^*_{max} - \delta out^*_{max}}{\delta in_{max} - \delta out_{max}} \times 100 \quad (1)$$

In actual designing, a steering mechanism is made closer to a parallel link geometry more often than to an ideal Ackermann geometry. In a case with a high Ackermann ratio 100% (curve X1 in FIG. 12A) or 80% (curve X2 in FIG. 12A) without a steering assisting force by an electronic power steering apparatus, when a steering angle $\theta_H$ is taken large at a low vehicle speed, vehicle speed VS=5 km/h for example, the steering torque T increases as the steering angle $\theta_H$ increases, and the steering angle vs. steering torque characteristic becomes such as to make the driver feel an increase in the steering reaction force.

Incidentally, the steering angle vs. steering torque characteristic in FIG. 12A is a trajectory of the steering angle vs. steering torque in a case of performing continuous steering operation fully to the left or right as represented by an arrow.

In comparison, in case that the Ackermann ratio is close to that of a parallel link geometry, such as 50% (curve X3 in FIG. 12A) or 30% (curve X4 in FIG. 12A), when the steering angle $\theta_H$ becomes large to a certain degree to the left or right, larger than or equal to $\theta_{H0}$ for example, variation in the steering torque T becomes flat, or when the steering angle $\theta_H$ becomes large to a certain degree, the steering torque T decreases in reverse such that the steering reaction force is saturated or conversely decreased despite increasing the steering angle $\theta_H$ for the driver and the steering angle vs. steering torque characteristic thus becomes to make the driver have a feeling of steering such as to be drawn to a larger steering angle $\theta_H$.

However, when the vehicle speed VS increases to become a medium or high speed, even with an Ackermann ratio of 50% or 30% (curve X4 in FIG. 12A), as shown in FIG. 12B as an example of vehicle speed VS=30 km/h, the difference from the case of an Ackermann ratio of 100% (curve X1) is small, and if a large steering angle $\theta_H$ is taken, the steering torque T increases as the steering angle $\theta_H$ increases so that steering angle vs. steering torque characteristic comes to make the driver have a feeling of an increase in the steering reaction force.

Particularly, if the minimum radius is set to the smallest possible like that of a mini-sized vehicle or a compact car, even an Ackerman ratio of 50% for a medium sized car or a large sized car, which are required to a small degree to enable a small turn, satisfies a required turning performance, however, steering angle vs. steering torque characteristic at a low vehicle speed, such as the curves X3 or X4 in the above-described FIG. 12A, is not desirable for a steering feeling given to a driver.

Accordingly, the present invention has an object to provide an electronic power steering apparatus applied to a vehicle provided with a steering mechanism with such a low Ackermann ratio, wherein the electronic power steering apparatus increases the steering reaction force in case that the steering angle to the left or the right at a low vehicle speed is larger than or equal to a predetermined angle. Embodiments according to the invention will be described below.

First Embodiment

Figure 1:
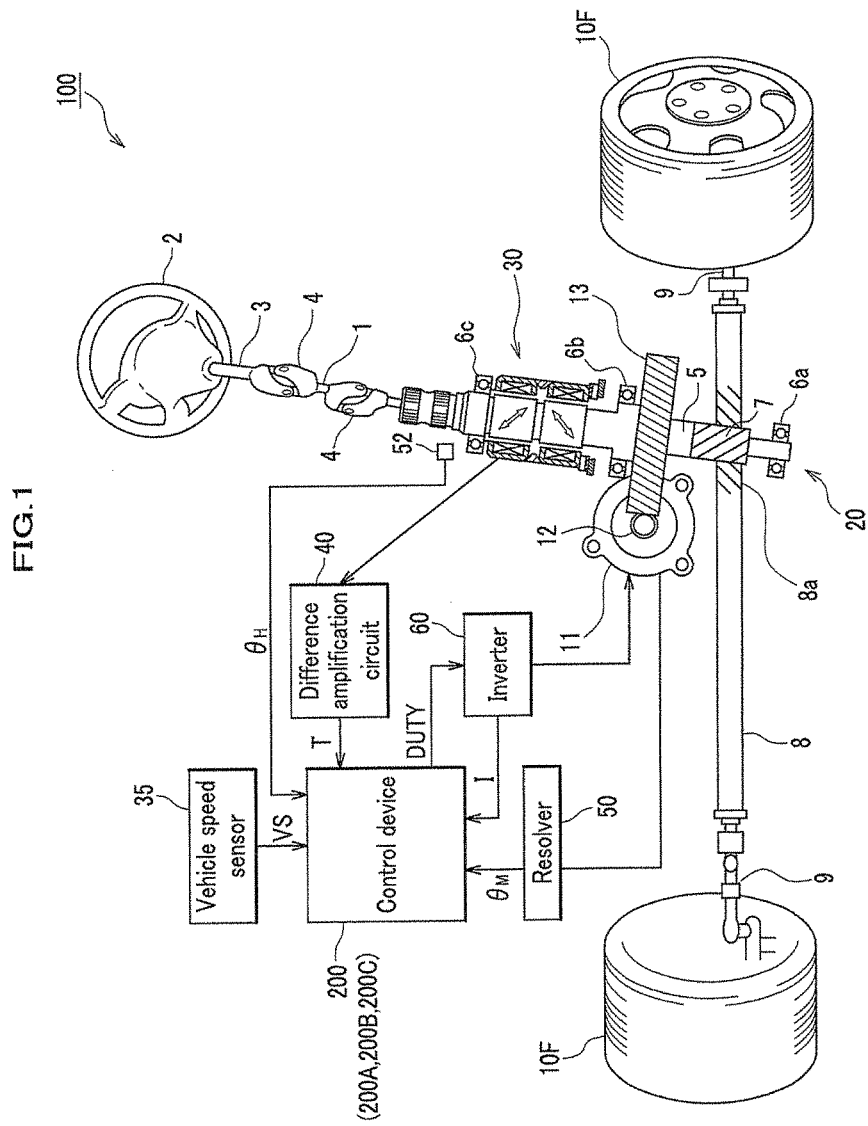
FIG. 1 shows the configuration of an electronic power steering apparatus in a first embodiment of the present invention.
Figure 2:
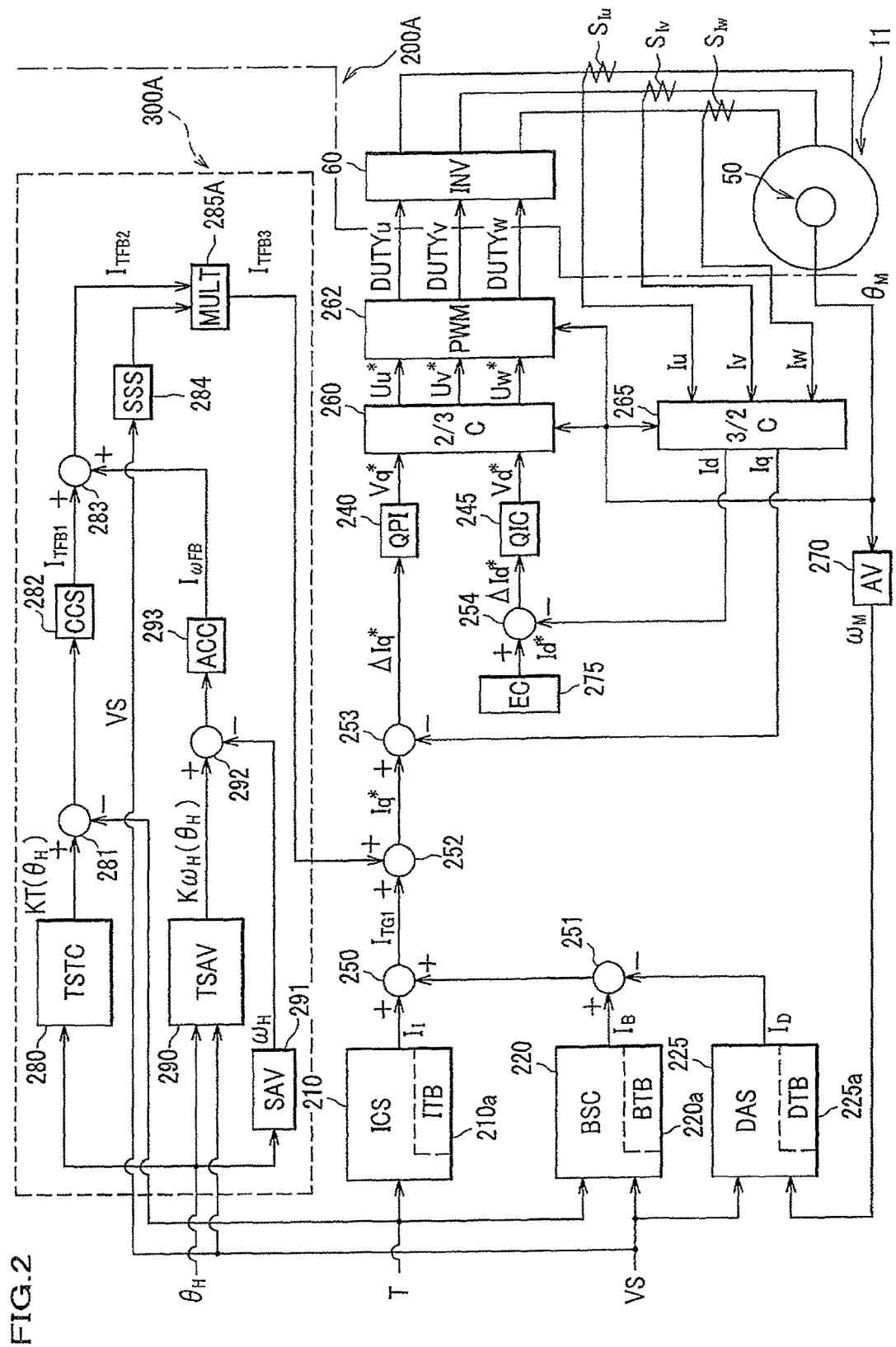
FIG. 2 shows the configuration of the function blocks of a control device in the first embodiment.

An electronic power steering apparatus in an embodiment of the present invention will be described, referring to FIG. 1 and FIG. 2. FIG. 1 shows the configuration of an electronic power steering apparatus in a first embodiment of the present invention. FIG. 2 shows the configuration of the function blocks of a control device in the first embodiment.

(Entire Configuration of Electric Power Steering Apparatus)

In FIG. 1, in an electronic power steering apparatus 100, a main steering shaft 3 provided with a steering wheel 2, a shaft 1, and a pinion shaft 5 are connected by two universal joints 4, 4. A pinion gear 7 arranged at the lower end portion of the pinion shaft 5 is gear-engaged with rack teeth 8a of a rack shaft 8 reciprocally movable along the vehicle lateral direction, and knuckle arms, not shown, of left and right steered wheels 10F, 10F are connected through tie rods 9, 9 at the ends of the rack shaft 8. By this configuration, the electronic power steering apparatus 100 can change the moving direction of the vehicle during steering by the steering wheel 2.

Herein, the rack shaft 8, the rack teeth 8a, the tie rods 9, 9, and the knuckles configure a steering mechanism. For the steering mechanism of a vehicle to which the electronic power steering apparatus 100 in the present embodiment is applied, the linkage positions between the tie rods 9 and the knuckle arms are arranged with an Ackermann ratio lower than that of an ideal Ackermann geometry, and the linkage is close to a parallel link with an Ackermann ratio of 50% or lower, for example.

The pinion shaft 5 is supported by a steering gear box 20 through bearings 6a, 6b, and 6c at the lower portion, the middle portion, and the upper portion thereof.

Further, the electronic power steering apparatus 100 is provided with an electric machine 11 for supplying a steering assisting force for reducing a steering force required through the steering wheel 2, and a worm gear 12 provided at the output shaft of the electric machine 11 is gear-engaged with a worm wheel gear 13 provided at the pinion shaft 5. That is, the worm gear 12 and the worm wheel gear 13 configure a reducing mechanism.

Herein, a steering system is configured by the shaft 1, the steering wheel 2, the rotor of the electric machine 11, the worm gear 12 connected to the electric machine 11, the worm wheel gear 13, the pinion shaft 5, the rack shaft 8, the rack teeth 8a, the tie rods 9,9 and the like. The electric machine (motor) 11 is a three phase brushless motor including a stator (not shown) provided with a plurality of field coils (not shown) and a rotor (not shown) that rotates inside the stator.

The electronic power steering apparatus 100 also includes a control device (motor control means) 200, an inverter 60 for driving the electric machine 11, a resolver 50, a steering torque sensor 30 for detecting the pinion torque applied to the pinion shaft 5, namely, the steering torque T, a difference amplification circuit 40 for amplifying an output from the steering torque sensor 30, a vehicle speed sensor 35, and a steering angle sensor 52 for detecting the steering angle of the steering wheel 2.

Incidentally, although the control device 200 is representatively shown in FIG. 1, a control device (motor control means) 200A described parenthetic corresponds to a control device in the first embodiment, a control device (motor control means) 200B corresponds to a control device in a second embodiment, and a control device (motor control means) 200C corresponds to a control device in a third embodiment.

The inverter 60 is provided with a plurality of switching elements, for example three-phase FET bridge circuits, and generates a rectangular wave, using a DUTY signal (represented by 'DUTYu', 'DUTYv', and 'DUTYw' in FIG. 2) from the control device 200, to thereby drive the electric machine 11. Further, the inverter 60 has a function to detect a three-phase actual current value I (represented by 'Iu', 'Iv', and 'Iw' in FIG. 2), using current sensors SIu, SIv, and SIw (see FIG. 2), such as Hall elements, and input the detected actual current value I to the control device 200. Incidentally, in FIG. 2, the current sensors $S_{Iu}$, $S_{Iv}$, and $S_{Iw}$ are shown outside the inverter 60 for easy recognition.

The resolver 50 detects the rotation angle $\theta_M$ of the rotor of the electric machine 11 and outputs an angle signal corresponding to the rotation angle $\theta_M$, and is, for example, a variable reluctance resolver configured by arranging a detection circuit for detecting variation in the magnetic resistance, adjacent to a magnetic rotator provided with a plurality of convex potions and concave portions at equal intervals along the circumferential direction.

A signal representing the operation angle of the steering wheel 2 detected by the steering angle sensor 52 is input to the control device 200, and converted into a steering angle θH of the steered wheels 10F, 10F, not shown.

Returning to FIG. 1, the steering torque sensor 30 detects a pinion torque applied to the pinion shaft 5, namely the steering torque T, and the steering torque sensor 30 is formed, for example, such that magnetic films are attached such as to be anisotropic in opposite directions at two positions, along the axial direction, of the pinion shaft 5 and a detection coil is inserted between the surfaces of the respective magnetic films such as to be separated from the pinion shaft 5. The difference amplification circuit 40 amplifies the difference in the magnetic permeability change between the two magnetic distortion films detected by the detection coil as inductance variation, and inputs a signal representing a steering torque T to the control device 200.

The vehicle speed sensor 35 detects the vehicle speed VS of the vehicle as a number of pulses per unit time, and outputs a signal representing the vehicle speed VS.
((Control Device))

Figure 3A:
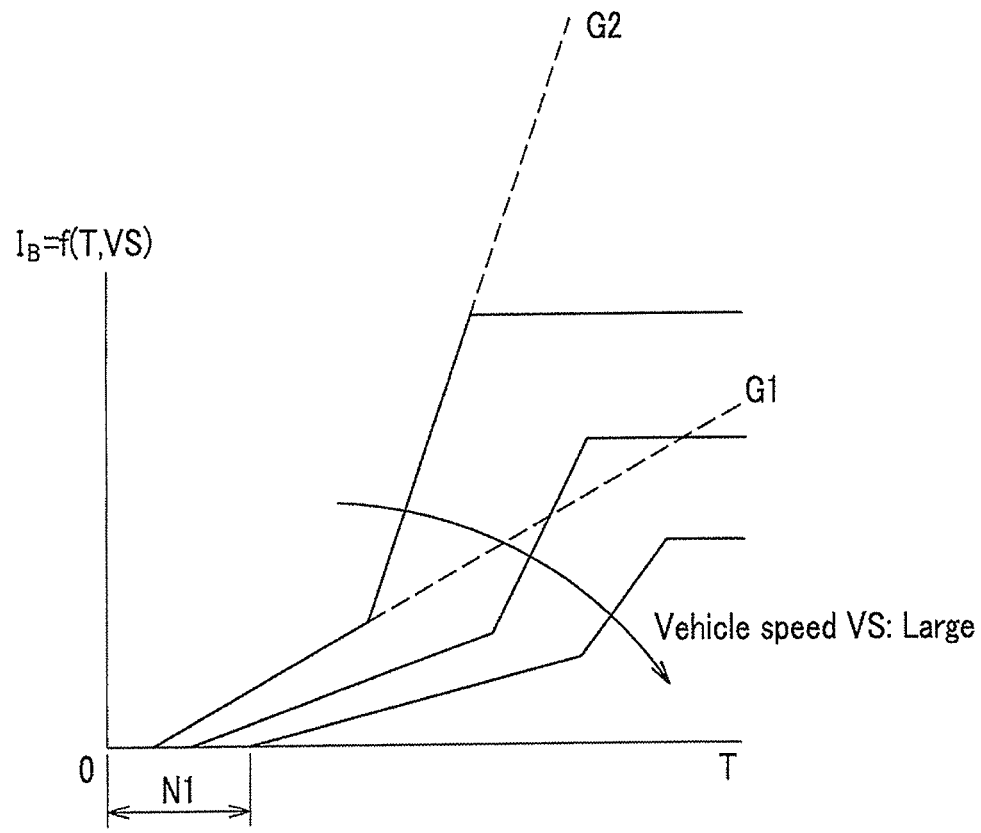
FIG. 3A illustrates a method of setting a base target current value by a base signal computation section, using a base table.
Figure 3B:
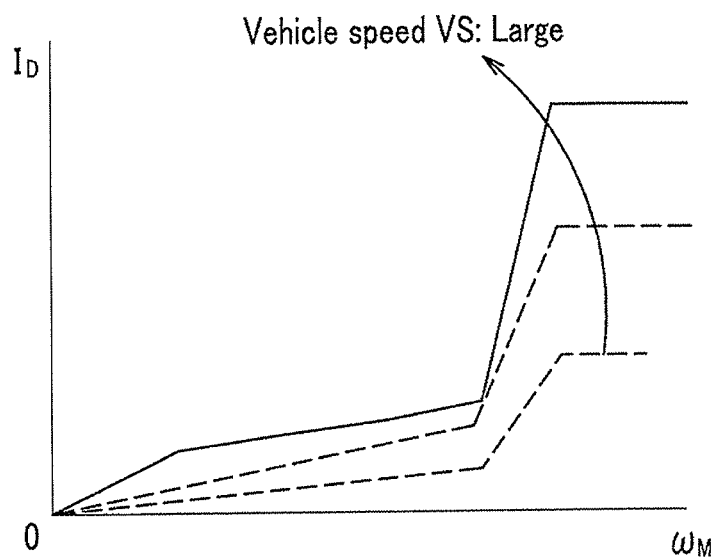
FIG. 3B illustrates a method of setting a damper adjustment current value by a damper adjusting signal computation section, using a damper table.

Referring to FIG. 2, and also referring to FIG. 1 and FIGS. 3 to 6, as appropriate, the configuration and functions of the control means (motor control means) 200A in the first embodiment will be described. FIG. 3A illustrates a method of setting a base target current value by a base signal computation section, using a base table, and FIG. 3B illustrates a method of setting a damper adjustment current value by a damper adjusting signal computation section, using a damper table.

The control device 200A is configured by microcomputer including a CPU (Central Processing Unit), a ROM (Read Only Memory), a RAM (Random Access Memory), and the like, an interface circuit, and programs stored in the ROM. The control device 200A implements the functions described in the configuration of the function blocks shown in FIG. 2.

The control device 200A in FIG. 2 includes a base signal computation section (second target current value computing means) 220, an inertia compensating signal computation section 210, a damper adjusting signal computation section 225, a q-axis PI control section 240, a d-axis PI control section 245, a 2-axis/3-phase conversion section 260, a PWM conversion section 262, a 3-phase/2-axis conversion section 265, an exciting current generation section 275, a low-vehicle-speed steering-reaction force control section 300A, and the like.
(Base Signal Computation Section 220)

The base signal computation section 220 generates a base target current value (fourth target current value) IB that is a target value as a reference for a steering assisting force output by an electric motor 11 (see FIG. 1), based on a signal representing a steering torque T from a differential amplifier circuit 40 (see FIG. 1) and a signal representing a vehicle speed VS from a vehicle speed sensor 35 (see FIG. 1). This generation of a base target current value IB is performed by referring to a base table 220a having been set in advance by experimental measurement or the like, with the steering torque T and the vehicle speed VS.

FIG. 3A shows functions of base target current value IB stored in the base table 220a. FIGS. 3A and 3B show an example of a case that the value of the steering torque T is positive, however, when the value of the steering torque T is negative, the value of base target current value IB becomes negative and the width of a dead band N1 is also set negative. Assuming that the steering torque T in rightward steering operation is positive (+) and the steering torque T in leftward steering operation is negative (−), the only difference between the left and steering torques T is the sign of ±. Accordingly, description on + side (right side) will be representatively made in the following description, and description on left side (− side) will be omitted, as appropriate.

Incidentally, also, as a dead band upper limit and a dead band lower limit are different in the symbol ±, description of the dead band lower limit will be omitted, as appropriate.

A base target current value IB with a value on + side is a current value for the electric motor 11 to generate a steering assisting force in the rightward direction, and a base target current value IB with a value on − side is a current value for the electric motor 11 to generate a steering assisting force in the leftward direction. Also regarding the signs ± of current values including a damper adjusting current value ID, an inertia compensating current value II, a q-axis target current value ITG1, a q-axis target current value Iq*, target current values ITFB1, ITFB2, and ITFB3, an adjusting current value IωFB, etc., which will be described later, a value on + side applies a rightward steering assisting force or a rightward steering reaction force to the steering wheel 2, and a value on − side applies a leftward steering assisting force or a leftward steering reaction force to the steering wheel 2.

Incidentally, also regarding a steering angle θH, the following description will be made assuming that a negative value is on the left side and a positive value is on the right side of the neutral state.

In an example of a case that the steering torque T is a positive value, as shown in FIG. 3A, the base signal computation section 220 has a characteristic that, using the base table 220a, if the positive value of the steering torque T is small, then a dead band N1 on the positive value side is provided wherein the base target current value IB is set to zero, and if the value of the steering torque T becomes larger than or equal to the positive upper limit value (upper limit torque of the dead band) of this dead band N1, then the base target current value IB linearly increases by gain G1. Further, the base signal computation section 220 has a characteristic that output increases by gain G2 from when the steering torque reaches a certain value, and if the steering torque value further increases, then output reaches a certain positive saturation value.

Both the dead band N1 on the positive value side and the dead band N1 on the negative value side will be hereinafter merely referred to as 'dead band N1'.

Further, the load of a road surface (road surface reaction force) on a vehicle is, in general, different depending on the running speed, the value of the upper limit torque, the gains G1, G2, and the saturation value of the base target current value |IB| are adjusted depending on the vehicle speed VS. The load is the heaviest in stationary steering operation with a vehicle speed of zero, and the load is comparatively light at a medium or low vehicle speed. Accordingly, as the vehicle speed VS becomes higher, the base signal computation section 220 set the gains (G1, G2) and the absolute value of the saturation value to be lower and the dead band upper limit torque to be larger to thereby make the manual steering region large so as to provide road surface information to the driver.

That is, a firm response feeling of the steering torque T is given, corresponding to an increase in the vehicle speed VS. Herein, it is necessary that inertia compensation is performed also in the manual steering region.

(Damper Adjusting Signal Computation Section 225)

Returning to FIG. 2, the damper adjusting signal computation section 225 is provided in order to compensate the viscosity of the steering system and also in order to implement a steering damper function for adjusting the convergence when the convergence drops during high-speed running of the vehicle. The damper adjusting signal computation section 225 performs computation, using a damper table 225a of the damper adjusting signal computation section 225 and referring to the angular velocity ωM of the electric motor 11. FIG. 3(b) shows functions of the damper adjusting current value ID stored in the damper table 225a. FIG. 3(b) shows a case where the value of the angular velocity ωM of the electric motor 11 is positive. In case where the value of the angular velocity ωM of the electric motor 11 is negative, the value of the damper adjusting current value ID becomes negative. The damper adjusting signal computation section 225 has the following characteristic. First, in the case of the example where the value of the angular velocity ωM is positive, as shown in FIG. 3B, the more the angular velocity ωM of the electric motor 11 increases, the more linearly the damper adjusting current value ID increases. The damper adjusting current value rapidly increases at a certain angular velocity ωM to become a certain positive saturation value corresponding to the vehicle speed VS.

Similarly, the damper adjusting signal computation section 225 also has the following characteristic. That is, in case that the value of the angular velocity ωM is negative, the more the angular velocity ωM of the electric motor 11 increases in the negative value direction, the more linearly the damper adjusting current value ID increases in the negative value direction. The damper adjusting current value rapidly increases in the negative value direction at a certain angular velocity ωM to become a certain negative saturation value corresponding to the vehicle speed VS.

The higher the value of the vehicle speed VS is, the larger the gain and the absolute value of the saturation value are made, and the angular velocity of the electric motor 11, in other words, the steering assisting force output by the electric motor 11 is damped, corresponding to the steering angular velocity, by subtraction of the damper adjusting current value ID from the base target current value IB by a subtractor 251.

In other words, in increasingly turning the steering wheel 2, as the rotational speed of the steering wheel 2 becomes higher, the value of a steering assisting current in the turn increasing direction supplied to the electric motor 11 is made lower so as to make the turning feeling of the steering wheel 2 heavier and harder. On the other hand, in decreasingly turning or returning the steering wheel 2, the value of a current in the direction of the reaction force to the returning operation is made higher to be supplied to the electric motor 11 so as to make the returning harder. By this steering damper effect, the convergence of the steering wheel 2 can be improved, and the turning movement characteristic of the vehicle can be stabilized.

(Subtractor 251)

Again returning to FIG. 2, the subtractor 251 subtracts the damper adjusting current value ID of the damper adjusting signal computation section 225 from the base target current value IB of the base signal computation section 220, and inputs a result to an adder 250.

(Inertia Compensating Signal Computation Section 210)

The inertia compensating signal computation section 210 compensates the effect of the inertia of the steering system, and computes the above-described inertia compensating current value II, using an inertia table 210a of the inertia compensating signal computation section 210 and referring to the steering torque T.

The inertia compensating signal computation section 210 also compensates a drop in the responsiveness caused by the inertia of the rotor of the electric motor 11. In other words, in switching from positive rotation to negative rotation or switching from negative rotation to positive rotation, as the electric motor 11 acts to maintain a state then by inertia, the rotational direction is not immediately switched. In this situation, the inertia compensating signal computation section 210 performs control such that switching of the rotational direction of the electric motor 11 agrees with the timing of switching of the rotational direction of the steering wheel 2. In such a manner, the inertia compensating signal computation section 210 reduces the delay of response in steering due to the inertia or viscosity of the steering system, and thereby gives a clear and simple steering feeling. Further, a practically sufficient characteristic is given, while steering characteristics are different depending on the vehicle characteristics of an FF (Front engine Front wheel drive) or FR (Front engine Rear wheel drive) vehicle, an RV (Recreation Vehicle), a sedan vehicle, etc., and the vehicle condition such as the vehicle speed, the road surface, and the like.

(Adders 250, 252, Subtractor 253, q-Axis PI Control Section 240)

The adder 250 adds an input from the subtractor 251 and the inertia compensating current value II from the inertia compensating signal computation section 210. The q-axis target current value ITG1, which is an output signal from the adder 250, is a target signal of a q-axis current for defining the output torque of the electric motor 11, and is input to an adder (adding means) 252.

A later-described target current value (second target current value) ITFB3 is input to an adder 252 from the low-vehicle-speed steering-reaction-force control section 300A, and the adder 252 inputs a q-axis target current value Iq* (fifth target current value), which is a result of adding the target current value ITFB3 to the q-axis target current value ITG1, to a subtractor 253. As a result, the q-axis target current value Iq* is input to the subtractor 253 after the adder 252 adjusts the steering angle vs. steering torque characteristic that the steering reaction force is saturated or drops in reverse when the steering angle θH in the region of a low vehicle speed VS, which is specific to a vehicle which adopts a steering mechanism with a low Ackermann ratio, becomes larger than a certain value to the left or right.

A q-axis real current value Iq is input from the 3-phase/2-axis conversion section 265 to the subtractor 253, and a result of subtracting the q-axis real current value Iq from the above-described q-axis target current value Iq* is input from the subtractor 253 to the q-axis PI control section 240 as a deviation value ΔIq*, which is a control signal.

The q-axis PI control section 240 performs feedback control of P (proportion) control and I (integration) control so that the deviation value ΔIq* decreases, obtains a q-axis target voltage value Vq*, which is a q-axis target signal, and inputs the q-axis target voltage value Vq* to the 2-axis/3-phase conversion section 260.

(Exciting Current Generation Section 275, Subtractor 254, and d-Axis PI Control Section 245)

The exciting current generation section 275 generates '0' as a target signal of a d-axis target current value Id* of the electric motor 11, wherein field-weakening control can be performed by making, as necessary, the d-axis target current value Id* and the q-axis target current value Iq* substantially equal to each other.

A d-axis real current value Id is input from the 3-phase/2-axis conversion section 265 to the subtractor 254, and the subtractor 254 inputs a result of subtracting the d-axis real current value Id from the above-described d-axis target current value Id*, to the d-axis PI control section 245 as a the deviation value ΔId*, which is a control signal.

The d-axis PI control section 245 performs PI feedback control of P (proportion) control and I (integration) control so that the deviation value ΔId* decreases, obtains a d-axis target voltage value Vd*, which is a d-axis target signal, and inputs the d-axis target voltage value Vd* to the 2-axis/3-phase conversion section 260.

(2-axis/3-phase Conversion Section 260, PWM Conversion Section 262)

The 2-axis/3-phase conversion section 260 converts a 2-axis signal of the d-axis target voltage value Vd* and the q-axis target voltage value Vq* into a 3-phase Uu*, Uv*, Uw*, using the rotation angle θM. The PWM conversion section 262 generates DUTY signals (in FIG. 2, represented by 'DUTYu', 'DUTYv', and 'DUTYw'), which are ON/OFF signals [(PWM (Pulse Width Modulation) signals) with pulse widths proportional to the magnitudes of three phase signals Uu*, Uv*, Uw*.

Herein, a signal representing the rotation angle θM of the electric motor 11 is input from the resolver 50 to the 2-axis/3-phase conversion section 260 and the PWM conversion section 262, and computation and control corresponding to the rotation angle θM of the rotor are performed.

(3-phase/2-axis Conversion Section 265)

Using the rotation angle θM, the 3-phase/2-axis conversion section 265 converts 3-phase real current values Iu, Iv, Iw of the electric motor 11 detected by current sensors SIu, SIv, SIw of the 60 into d-axis real current value Id, and q-axis real current value Iq in a d-q coordinate system, inputs the d-axis real current value Id to the subtractor 254, and inputs the q-axis real current value Iq to the subtractor 253.

Incidentally, the q-axis real current value Iq is proportional to a torque generated by the electric motor 11, and the d-axis real current value Id is proportional to the exciting current.

(Angular Velocity Computation Section 270)

The angular velocity computation section 270 computes an angular velocity ωM by temporally differentiating the input rotation angle θM, and outputs a result to the damper adjusting signal computation section 225.

((Low-Vehicle-Speed Steering-Reaction-Force Control Section 300A, Adder 252))

In the following, referring to FIG. 2 and FIGS. 4 to 6, the low-vehicle-speed steering-reaction-force control section 300A with configuration, which is a feature in the present embodiment, will be described.

Figure 4:
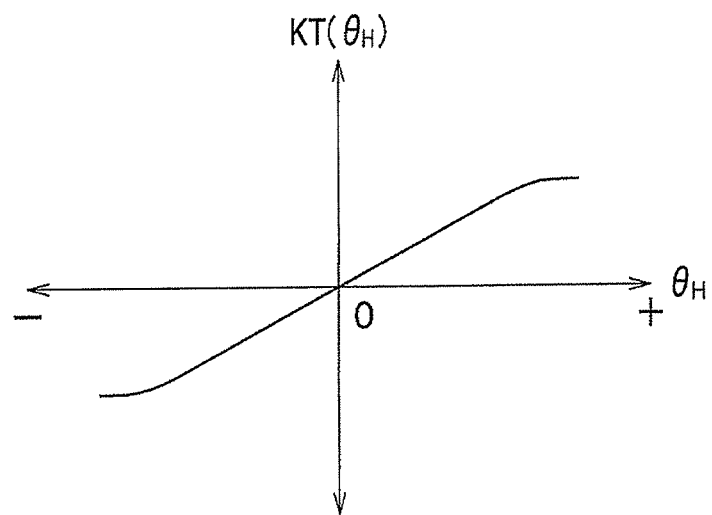
FIG. 4 illustrates a method of setting the value of a steering angle sensitive target steering torque by a steering angle sensitive target steering torque setting section.
Figure 5:
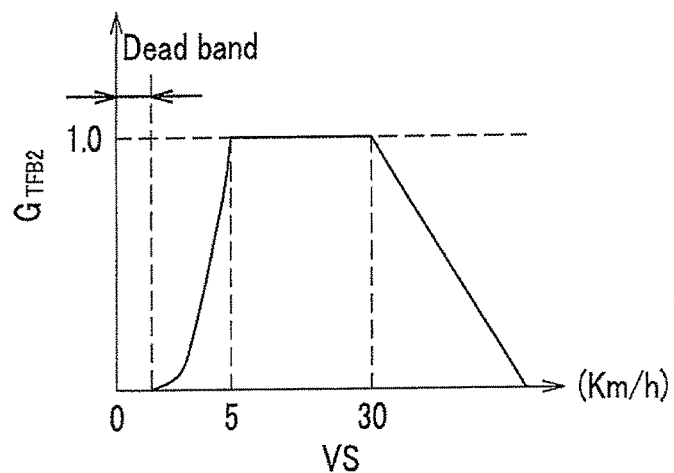
FIG. 5 illustrates a method of setting a vehicle speed sensitive gain by a vehicle speed sensitive gain setting section.
Figure 6:
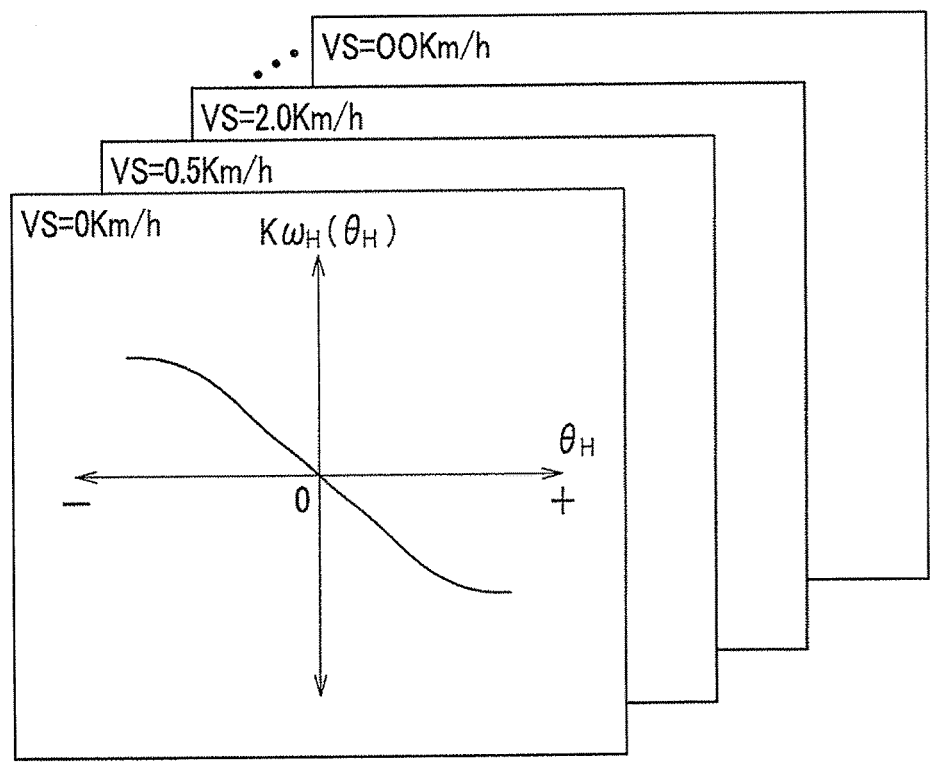
FIG. 6 illustrates a method of setting the value of a steering angle sensitive target steering angular velocity by a steering angle sensitive target steering angular velocity setting section.

FIG. 4 illustrates a method of setting the value of a steering angle sensitive target steering torque by a steering angle sensitive target steering torque setting section. FIG. 5 illustrates a method of setting a vehicle speed sensitive gain by a vehicle speed sensitive gain setting section. FIG. 6 illustrates a method of setting the value of a steering angle sensitive target steering angular velocity by a steering angle sensitive target steering angular velocity setting section.

As shown in FIG. 2, the low-vehicle-speed steering-reaction-force control section 300A includes a target steering torque computation section (target steering torque setting means) 280, a subtractor (torque deviation computing means) 281, a current conversion section (first target current computing means) 282, an adder 283, a vehicle speed sensitive gain setting section (vehicle speed sensitivity adjusting means) 284, a multiplier (vehicle speed sensitivity adjusting means) 285A, a target steering angular velocity computation section (target steering angular velocity computing means) 290, steering angular velocity computation section (steering angular velocity computing means) 291, a subtractor (steering angular velocity deviation computing means) 292, and an adjusting current conversion section (third target current value computing means) 293, wherein a target current value ITFB3 (second target current value) output from the multiplier 285A is input to the adder 252. Then, as described above, the adder 252 adds the target current value ITFB3 to a q-axis target current value ITG1 output from the adder 250, and outputs a result to the subtractor 253 as a q-axis target current value Iq*.

The configuration and the function of the low-vehicle-speed steering-reaction-force control section 300A will be described below in detail.

(Target Steering Torque Computation Section 280)

As shown in FIG. 4, the target steering torque computation section 280 computes a target steering torque KT (θH), based on an input steering angle θH, and inputs the target steering torque KT (θH) to the subtractor 281. Hereinafter, a target steering torque KT (θH) will be referred to as 'a steering angle sensitive target steering torque KT (θH)'. The function shape of the steering angle sensitive target steering torque KT (θH) is set, corresponding to the steering angle θH, such that if the steering angle θH increases to the right side (+ side), the steering angle sensitive target steering torque KT (θH) also increases to + side, and if the steering angle θH increases to the left side (− side), the steering angle sensitive target steering torque KT (θH) also increases to − side.

This function shape of the steering angle sensitive target steering torque KT (θH) computes and determines a generated steering torque of a vehicle having a steering mechanism with an Ackermann ratio, for example of 80 to 100%, in advance by simulation computation or the like, wherein the steering torque is generated in a low vehicle speed VS region, in a region of vehicle speed VS lower than 5 km/h to 30 km/h for example. Herein, it is assumed that a single function shape is set for the low vehicle speed region.

(Subtractor 281)

To the subtractor 281, input are a signal of steering torque T from the steering torque sensor 30 and a signal of steering angle sensitive target steering torque KT (θH) from the target steering torque computation section 280. The subtractor 281 subtracts the steering torque T from the steering angle sensitive target steering torque KT (θH), and inputs a torque deviation as a result of the subtraction to the current conversion section 282. That is, adding feedback of steering torque T, which is a real steering toque, to the steering angle sensitive target steering torque KT (θH), a torque deviation is obtained, and as described later, the current conversion section 282 computes a target current value (first target current value) ITFB1.

(Current Conversion Section 282)

The current conversion section 282 computes a target current value ITFB1, according to a torque deviation that is input from the subtractor 281. Herein, in a low speed running state of a vehicle having a steering mechanism with an Ackermann ratio of 50% or lower, when the steering angle θH becomes large to the left or right side, the absolute value of the steering torque T becomes smaller than the absolute value of the steering angle sensitive target steering torque KT (θH), and the target current value ITFB1 comes to have a sign for returning to the neutral point. For example, in case of rightward steering, the target current value ITFB1 becomes a value on − side and the leftward reaction force component increases, and in case of leftward steering, the target current value ITFB1 becomes a value on + side and the rightward reaction force component increases. That is, a gain GTFB1 (not shown) used by the current conversion section 282 to compute the target current value ITFB1 from the torque deviation is, for example, a constant negative value.

Incidentally, in case of rightward steering, when the value of the steering torque T is larger than the value of the steering angle sensitive target steering torque KT (θH), the target current value ITFB1 becomes a value on + side and a steering assisting force is generated rightward. In reverse, in case of leftward steering, when the absolute value of the negative value of the steering torque T is larger than the absolute value of the negative value of the steering angle sensitive target steering torque KT (θH), the target current value ITFB1 becomes a value on − side and a steering assisting force is generated leftward.

(Vehicle Speed Sensitive Gain Setting Section 284)

In the vehicle speed sensitive gain setting section 284, when the absolute value of the steering angle θH is larger than or equal to a predetermined value in a low vehicle speed region for a vehicle adopting a steering mechanism with an Ackermann ratio of 50% or lower, a vehicle speed region of 5 to 30 km/h for example, in order to reduce a feeling of strangeness, for a driver, that is different from a steering reaction force of a vehicle having a steering mechanism with an Ackermann ratio of for example 80 to 100% for example, the gain GTFB2 is set to 1.0 only in this vehicle speed region. In a vehicle speed region lower than 5 km/h for example and including the stopping state, as shown in FIG. 5, the gain GTFB2 is set a low value including a dead band; the value of the gain GTFB2 rapidly increases up to 1.0 as the vehicle speed becomes closer to 5 km/h; the value of the gain GTFB2=1.0 in a vehicle speed region of 5 to 30 km/h; and in a vehicle speed region higher than or equal to 30 km/h, the value of gain GTFB2 decreases linearly and smoothly down to 0 for example.

Incidentally, the value of the gain GTFB2 is 0 (zero) in the above-described dead band.

By setting the value of the value of gain GTFB2 in such a manner, while reducing a drop in the steering assisting force that is output from the electric motor 11 during stationary steering operation of the steering wheel 2 (see FIG. 2), the vehicle speed sensitive gain setting section 284 can apply a steering reaction force in a low vehicle speed region of a vehicle having a steering mechanism, for example, with an Ackermann ratio of 80 to 100%. When the vehicle speed VS becomes 30 km/h or higher, an increase in the steering reaction force by the low-vehicle-speed steering-reaction-force control section 300A is decreased so that the control is smoothly switched to a control similar to control of an ordinary electronic power steering apparatus.

The value of the gain GTFB2 having been set by the vehicle speed sensitive gain setting section 284 is input to the multiplier 285A.

(Target Steering Angular Velocity Computation Section 290)

As shown in FIG. 6, based on a steering angle θH and a vehicle speed VS having been input, the target steering angular velocity computation section 290 computes a target steering angular velocity KωH (θH) along the direction for returning to the neutral point (straight running state) of the steering wheel 2 (see FIG. 1) and inputs the target steering angular velocity KωH (θH) to the subtractor 292. A target steering angular velocity KωH (θH) will be referred to as 'a steering angle sensitive target steering angle velocity KωH (θH)'. The function of target steering angular velocity KωH (θH) is set with the vehicle speed VS as a parameter, based on the steering angle θH, and is arranged such as to perform interpolation computation on the vehicle speed VS.

(Steering Angular Velocity Computation Section 291, Subtractor 292, Adjusting Current Conversion Section 293)

The steering angular velocity computation section 291 temporally differentiates a signal representing the steering angle θH input from a steering angle sensor 52, thereby computes a steering angular velocity ωH, and inputs the steering angular velocity ωH to the subtractor 292.

A signal of the target steering angular velocity KωH (θH) from the target steering angular velocity computation section 290 and a signal of the steering angular velocity ωH from the steering angular velocity computation section 291 are input to the subtractor 292; the subtractor 292 subtracts the steering angular velocity ωH from the target steering angular velocity KωH (θH); and inputs a steering angular velocity deviation value as a result to the adjusting current conversion section 293.

The adjusting current conversion section 293 multiplies the steering angular velocity deviation value input from the subtractor 292 by a certain constant gain GωFB, thus converts the steering angular velocity deviation value into an adjusted current value (sixth target current value) IωFB, and inputs the adjusted current value to the adder (damp adding means) 283.

Incidentally, the target steering angular velocity KωH (θH) is always set as a target steering angular velocity in the returning direction toward the neutral point of the steering wheel 2 (see FIG. 1). Accordingly, by computation by the subtractor 292 and the adjusting current conversion section 293, a reaction component is applied to the operation of the steering wheel 2 during increasing-turning operation of the steering wheel 2 in the left or right direction by the driver.

Further, during returning operation toward the neutral point of the steering wheel 2 by the driver, in case of returning operation toward the neutral point wherein the real steering angular velocity ωH from the steering angular velocity computation section 291 is higher than the target steering angular velocity KωH (θH), a reaction force component is applied by computation by the subtractor 292 and the adjusting current conversion section 293, such as not to quickly return the steering wheel 2 to the neutral point. In reverse, in case of returning operation toward the neutral point wherein the real steering angular velocity ωH is lower than the target steering angular velocity KωH (θH), steering assistance is applied such that the real steering angular velocity ωH becomes the target steering angular velocity KωH (θH).

(Adder 283, Multiplier 285A)

A target current value ITFB1 is input from the current conversion section 282 and an adjusting current value IωFB is input from the adjusting current conversion section 293 to the adder 283, and the adder 283 adds the adjusting current value IωFB to the target current value ITFB1, and inputs an adjusted target current value (adjusted first target current value) IωFB2 to the multiplier 285A.

The multiplier 285A multiplies the adjusted target current value (adjusted first target current value) ITFB2 by a gain GTFB2 that is input from the vehicle speed sensitive gain setting section 284, and inputs a result to the adder 252 as a target current value ITFB3 (second target current value).

Figure 7A:
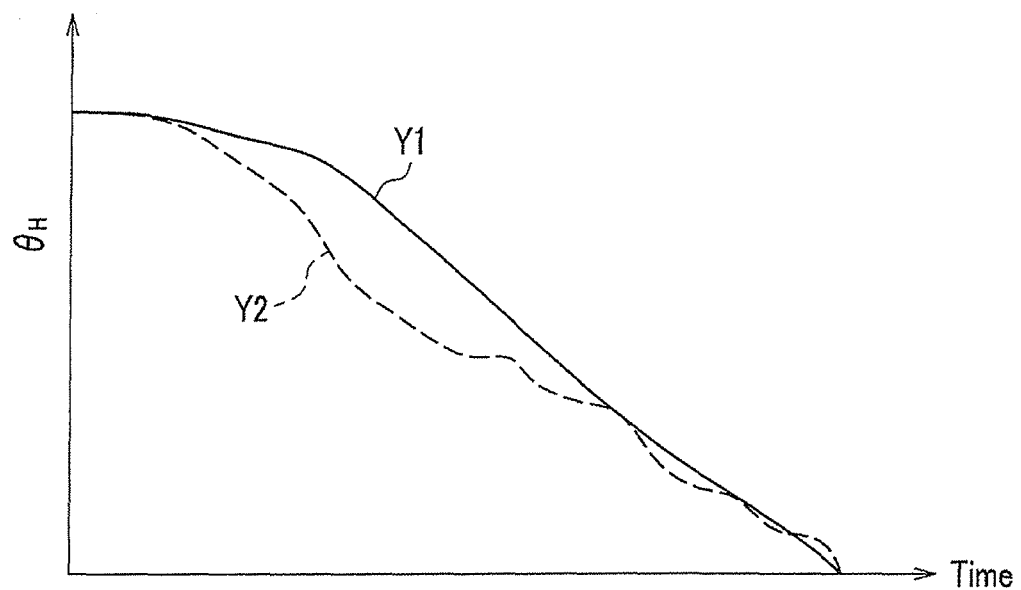
Figure 7B:
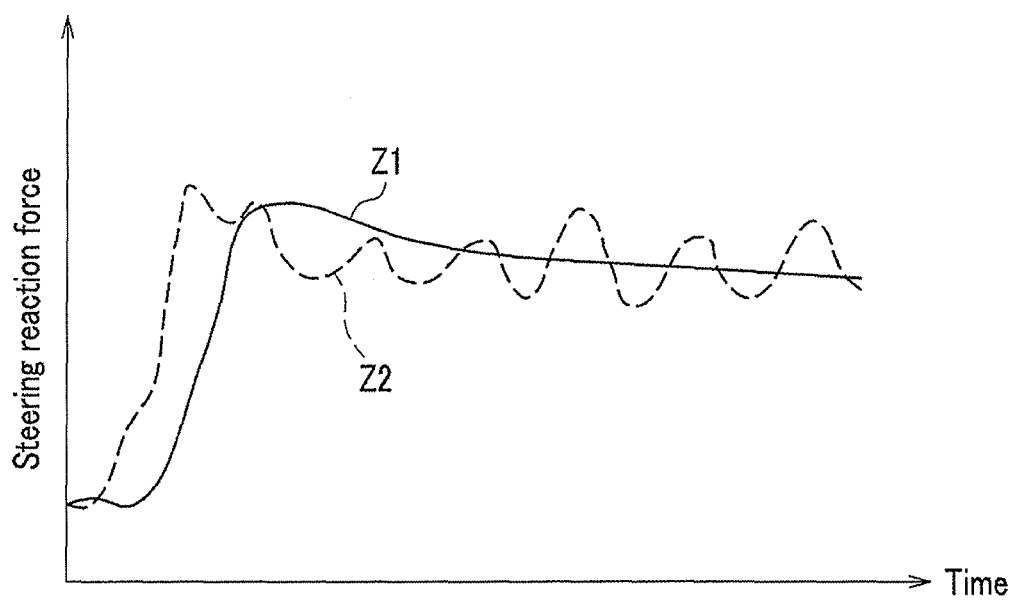

FIG. 7 illustrates operations in the first embodiment, wherein FIG. 7A illustrates temporal transition of steering angle in returning operation to a neutral point, and FIG. 7B illustrates temporal transition of steering reaction force in the returning operation to the neutral point.

The subtractor 292 computes a steering angular velocity deviation value; the adjusting current conversion section 293 converts the steering angular velocity deviation value into an adjusting current value IωFB; and the adjusting current value IωFB is input to the adder 283. Advantages of this operation will be described below.

When the steering angle θH is larger than or equal to a predetermined value to the left or right, variation in the value of the torque deviation that is output from the subtractor 281 is large with respect to the rate of temporal variation in the steering angle θH, and the temporal variation in the target current value ITFB1 becomes large. Accordingly, for example, as represented by the dashed curve Z2 of temporal transition of the steering reaction force in FIG. 7B, the returning operation of the steering wheel 2 (see FIG. 1) becomes vibratory. In this situation, by inputting an adjusting current value IωFB to the adder 283 and adjusting the target current value ITFB1, the steering reaction force in the low vehicle speed region can be smoothly adjusted as represented by the solid curve Z1 in FIG. 7B.

As a result, regarding variation in steering angle θH in a low vehicle speed region, saturation of steering reaction force at a steering angle θH that is large in the left or right side and the feeling of strangeness caused by disturbance in operating a steering wheel, which are apt to occur on a vehicle adopting a steering mechanism with a low Ackermann ratio, are eliminated. Thus, it is possible to stably give a feeling of steering such that the more the steering angle θH increases, the more a steering reaction force increases by self-aligning torque increases, which occurs the same as on a vehicle adopting a steering mechanism with a high Ackermann ratio of, for example, 80 to 100%.

Herein, the target steering angular velocity computation section 290, the steering angular velocity computation section 291, the subtractor 292, the adjusting current conversion section 293, and the adder 283 configure 'variation width reducing means' described in claims.

According to the present embodiment, for example, even on a vehicle having a steering mechanism with a low Ackermann ratio of 30 to 50%, it is possible to stably give a driver a feeling of steering, even in a low vehicle speed region of for example 5 to 30 km/h, such that the more the steering angle θH increases, the more a steering reaction force increases by self-aligning torque, which occurs the same as on a vehicle adopting a steering mechanism with a high Ackermann ratio of, for example, 80 to 100%.

In a medium-high vehicle speed region where the vehicle speed VS is higher than or equal to 30 km/h, even on a vehicle having a steering mechanism with a low Ackermann ratio of 30 to 50%, a self-aligning torque is sufficiently generated with a steering angle θH larger than or equal to a certain value on the left or right side and a steering reaction force is thus applied to the steering wheel 2. Accordingly, even if the value of the target current value ITFB3 rapidly and continuously decreases and finally becomes 0 (zero), the feeling of strangeness is not caused on the driver.

Further, in general, in a stop or ultra-low speed state of a vehicle adopting a steering mechanism with a high Ackermann ratio of for example 80 to 100%, in case of performing substantially stationary steering operation of the steering wheel 2, when the steering angle θH is fully taken on the left or right side, the higher the Ackermann ratio is, the larger the turning angle of the steered wheel 10F (see FIG. 1) on the increasing-turning direction side (inner steering direction) becomes, and the steering load of the steered wheel 10F on the increasing-turning direction side increases. Accordingly, it is necessary to make the steering assisting force to be output from the electric motor 11 strong, and make the capacity of the electric motor 11 large.

On the other hand, on a vehicle adopting a steering mechanism with a low Ackermann ratio of 30 to 50% as in the present embodiment, in case of performing substantially stationary steering operation of the steering wheel 2 in a stop or ultra-low speed state of a vehicle, even when the steering angle θH is fully taken on the left or right side, the turning angle of the steered wheel 10F (see FIG. 1) on the increasing-turning direction side does not become so large as in a case of a high Ackermann ratio. Accordingly, as the steering load of the steered wheel 10F on the increasing-turning direction side decreases compared with the above-described case of a high Ackermann ratio, it is possible to reduce the capacity of the electric motor 11 and finally reduce the vehicle weight to contribute to improvement in fuel economy.

Further, in the present embodiment, by providing the vehicle speed sensitive gain setting section 284 and the multiplier 285A, it is prevented that a driver has the feeling of strangeness that the steering reaction force is saturated or decreases in reverse in case of a steering angle θH larger than a certain value, which is a problem specific to a vehicle adopting a steering mechanism with a low Ackermann ratio of 30 to 50% in a stop or ultra-low vehicle speed state (vehicle speed VS lower than 5 km/h) or in a medium-high vehicle speed state (for example, vehicle speed VS higher than 30 km/h).

Further, conventionally, arrangement is made such as to set a steering wheel return base current value Irh, corresponding to the steering angle θH, as described on a basic current section 131 of a steering wheel return control section 130 in FIG. 2 of Patent Document 4, wherein it is necessary to change the setting of the data of the steering wheel return basic current value Irh each time the vehicle body design or the capacity of the electric motor 11 is different.

In contrast, in the present embodiment, the steering angle sensitive target steering torque KT (θH) is set by the target steering torque computation section 280, and the target current value ITFB1 is computed, based on the torque deviation from the steering torque T. Accordingly, an arrangement is made such as to allow an extremely easy adjustment that only requires adjusting the gains GTFB1 and GωFB each time the vehicle body design or the capacity of the electric motor 11 is different.

Further, in the present embodiment, as described above, the steering angle sensitive target steering torque KT (θH) is set by the target steering torque computation section 280, and the target current value ITFB1 is computed, based on the torque deviation from the steering torque T. Accordingly, even in case that the steering torque T is low on a low-μ road surface, the low-vehicle-speed steering-reaction-force control section 300A finally outputs the target current value ITFB3 so as to apply a steering reaction force to the driver. Thus, without a feeling of strangeness, the driver can have a steering feeling in a region of steering angle larger than or equal to a certain steering angle θH on the left or right side, in a low vehicle speed running state on a low-μroad surface, for example an ice covered road surface.

Incidentally, in the present embodiment, the multiplier 285A is provided to multiply the adjusted target current value ITFB2 by the value of the gain GTFB2 having been set by the vehicle speed sensitive gain setting section 284, however, the invention is not limited thereto.

Removing the multiplier 285A, an arrangement may be made such as to input the value of the gain GTFB2 to the current conversion section 282, multiply the torque deviation by the gain GTFB1 and the gain GTFB2 by the current conversion section 282, input the value of the gain GTFB2 to the adjusting current conversion section 293, and multiply the steering angular velocity deviation value by the gain GωFB and the gain GTFB2 by the adjusting current conversion section 293.

Or, removing the multiplier 285A, an arrangement may be made such as to input the value of the gain GTFB2 to the current conversion section 282, and multiply the torque deviation by the gain GTFB1 and the gain GTFB2 by the current conversion section 282.

((Modified Example of First Embodiment))

In the first embodiment, the control device 200A is configured to include the inertia compensating signal computation section 210, the base signal computation section 220, the damper adjusting signal computation section 225, the adder 250, the subtractor 251, the adder 252, the adder 283, the vehicle speed sensitive gain setting section 284, the multiplier 285A, the target steering angular velocity computation section 290, the steering angular velocity computation section 291, the subtractor 292, and the adjusting current conversion section 293, however, the invention is not limited thereto.

(First Modified Example of First Embodiment)

A first modified example of the first embodiment will be described below.

In the present modified example, the control device 200A is configured, removing all of the inertia compensating signal computation section 210, the base signal computation section 220, the damper adjusting signal computation section 225, the adder 250, the subtractor 251, the adder 252, the adder 283, the vehicle speed sensitive gain setting section 284, the multiplier 285A, the target steering angular velocity computation section 290, the steering angular velocity computation section 291, the subtractor 292, and the adjusting current conversion section 293.

That is, the target current value ITFB1, which is the first target current value being output from the current conversion section 282, may be directly input to the subtractor 253.

According to the present modified example, even in case that a vehicle having a steering mechanism with an Ackermann ratio lower than an ideal ratio has a substantially parallel geometry wherein, when the steering angle becomes large on the left or right side in a low vehicle speed region, the steering reaction force is saturated or the steering reaction force is reduced; the subtractor 281 computes a torque deviation, between the steering angle sensitive target steering torque KT (θH) set by the target steering torque computation section 280 and the steering torque T detected by the steering torque sensor 30. Then, based on the torque deviation computed by the subtractor 281, the current conversion section 282 generates a steering assisting force or a steering reaction force by the electric motor 11. Accordingly, an arrangement is made such that, when the steering angle is larger than or equal to a certain value on the left or right side, a target current value ITFB1, which is the first target current value, is computed, based on the torque deviation between the steering angle sensitive target steering torque KT (θH) and the steering torque T. Thus, painstaking work such as resetting data, by testing or the like, for computing the target current value ITFB1 by the target steering torque computation section 280, each time the vehicle body design or the capacity of the motor is different, is unnecessary, and a simple configuration which only requires changing the gain GTFB1 of the current conversion section 282 can be made.

(Second Modified Example of First Embodiment)

A second modified example of the first embodiment will be described below.

In the present modified example, the control device 200A is configured, removing the inertia compensating signal computation section 210, the base signal computation section 220, the damper adjusting signal computation section 225, the adder 250, the subtractor 251, the adder 252, the adder 283, the target steering angular velocity computation section 290, the steering angular velocity computation section 291, the subtractor 292, and the adjusting current conversion section 293.

That is, an arrangement may be made such that the target current value ITFB1, which is the first target current value output from the current conversion section 282, is multiplied by the gain GTFB2 output from the vehicle speed sensitive gain setting section 284 by the multiplier 285A, thereby adjusted to become the target current value ITFB3, which is the second target current value, and directly input to the subtractor 253.

According to the present modified example, in addition to the advantage of the above-described first modified example, as the control device 200A includes the vehicle speed sensitive gain setting section 284 and the multiplier 285A which adjust the target current value ITFB1, which is the first target current value, and output the target current value ITFB3, which is the second target current value, the control device 200A control the electric motor 11 to generate a steering assisting force or a steering reaction force, based on the target current value ITFB3. As a result, similarly to a case of a vehicle adopting a steering mechanism with a high Ackermann ratio, even on a vehicle having a steering mechanism with a low Ackermann ratio, it is possible to stably give the driver a steering feeling, even in the low vehicle speed region, by the target current value ITFB3 output from the multiplier 285A, such that the more the steering angle θH increases on the left or right side, the more the steering reaction force increases by a self-aligning torque.

In the medium-high vehicle speed VS region, even on a vehicle having a steering mechanism with a low Ackermann ratio, a self-aligning torque is sufficiently generated with a steering angle larger than or equal to a certain value on the left or right side, and a steering reaction force is applied to the steering wheel 2. Accordingly, the driver does not have a feeling of strangeness even if the vehicle speed sensitive gain setting section 284 and the multiplier 285A continuously decrease the target current value ITFB3 and finally decrease the target current value ITFB3 down to 0 (zero), corresponding to increase in the vehicle speed VS.

(Third Modified Example of First Embodiment)

A third modified example of the first embodiment will be described below.

In the present modified example, the control device 200A is configured, removing the adder 283, the vehicle speed sensitive gain setting section 284, the multiplier 285A, the target steering angular velocity computation section 290, the steering angular velocity computation section 291, the subtractor 292, and the adjusting current conversion section 293.

That is, an arrangement may be made such that the target current value ITFB1, which is the first target current value output from the current conversion section 282, is added with the q-axis target current value ITG1 output from the adder 250 by the adder 252 to form the q-axis target current value Iq*, which is the fifth target current value, and the q-axis target current value Iq* is input to the subtractor 253.

According to the present modified example, the q-axis target current value ITG1 for which at lease the base target current value IB, which is the fourth target current value, is taken into account is input to the adder 252. Based on the q-axis target current value Iq*, which is the fifth target current value as a result of adding computation on the target current value ITFB1, which is the first target current value, with at least the base target current value IB, the control device 200A can perform control of output of the steering assisting force from the electric motor 11 by the base target current value IB similarly to a case of a vehicle adopting an ordinary steering mechanism with a high Ackermann ratio. In addition, the steering angle vs. steering torque characteristic is adjusted by the adder 252, and the target current value ITFB1 with this adjustment is output to the subtractor 253 as the q-axis target current value Iq* to be used for control of the steering assisting force or the steering reaction force output from the electric motor 11, wherein the steering angle vs. steering torque characteristic of the target current value ITFB1 is specific to a vehicle adopting a steering mechanism with a low Ackermann ratio and includes saturation or, in reverse, drop of the steering reaction force that occurs when the steering angle θH becomes large on the left or right side, exceeding a certain value in a low vehicle speed region.

As a result, for example, even on a vehicle having a steering mechanism with a low Ackermann ratio, it is possible to stably give the driver a feeling of steering similar to that of a vehicle adopting a steering mechanism with a high Ackermann ratio, even in a low vehicle speed region, such that the more the steering angle θH increases on the left or right side, the more a steering reaction force increases by self-aligning torque.

(Fourth Modified Example of First Embodiment)

A fourth modified example of the first embodiment will be described below.

In the present modified example, the control device 200A is configured, removing the adder 283, the target steering angular velocity computation section 290, the steering angular velocity computation section 291, the subtractor 292, and the adjusting current conversion section 293.

That is, an arrangement also may be made such that the target current value ITFB1, which is the first target current value output from the current conversion section 282, is multiplied, by the multiplier 285A, by the gain GTFB2 output from the vehicle speed sensitive gain setting section 284 to thereby be adjusted, thus becomes the target current value ITFB3, which is the second current value, and output to the adder 252, further, added by the adder 252 with the q-axis target current value ITG1 output from the adder 250 to become the q-axis target current value Iq*, which is the fifth target current value, and input to the subtractor 253.

In addition to the advantages of the third modified example of the first embodiment, according to the present modified example, in a medium-high vehicle speed range of the vehicle speed VS, also on a vehicle having a steering mechanism with a low Ackermann ratio, as a self-aligning torque is sufficiently generated with a steering angle larger than or equal to a certain amount on the left or right side, and a steering reaction force is applied to the steering wheel 2. Accordingly, the driver does not have a feeling of strangeness even if the vehicle speed sensitive gain setting section 284 and the multiplier 285A continuously decrease the target current value ITFB3 and finally decrease the target current value ITFB3 down to 0 (zero), corresponding to increase in the vehicle speed VS.

((Second Embodiment))

In the following, referring to FIGS. 8 and 9, and also referring to FIGS. 4 and 12, as appropriate, a control device (motor control means) 200B of an electronic power steering apparatus 100 in a second embodiment will be described.

The control device 200B of the electronic power steering apparatus 100 in the second embodiment is different from the control device 200A of the electronic power steering apparatus 100 in the first embodiment in that the lowvehicle-speed steering-reaction-force control section 300A is replaced by a low-vehicle-speed steering-reaction-force control section 300B.

The same symbols will be assigned to the same elements as those in the first embodiment, and overlapping description will be omitted. FIG. 8 shows the configuration of the function blocks of the control device in the second embodiment. FIG. 9 illustrates a method of setting a steering angle sensitive gain by the steering angle sensitive gain setting section.

(Low-Vehicle-Speed Steering-Reaction-Force Control Section 300B)

Figure 8:
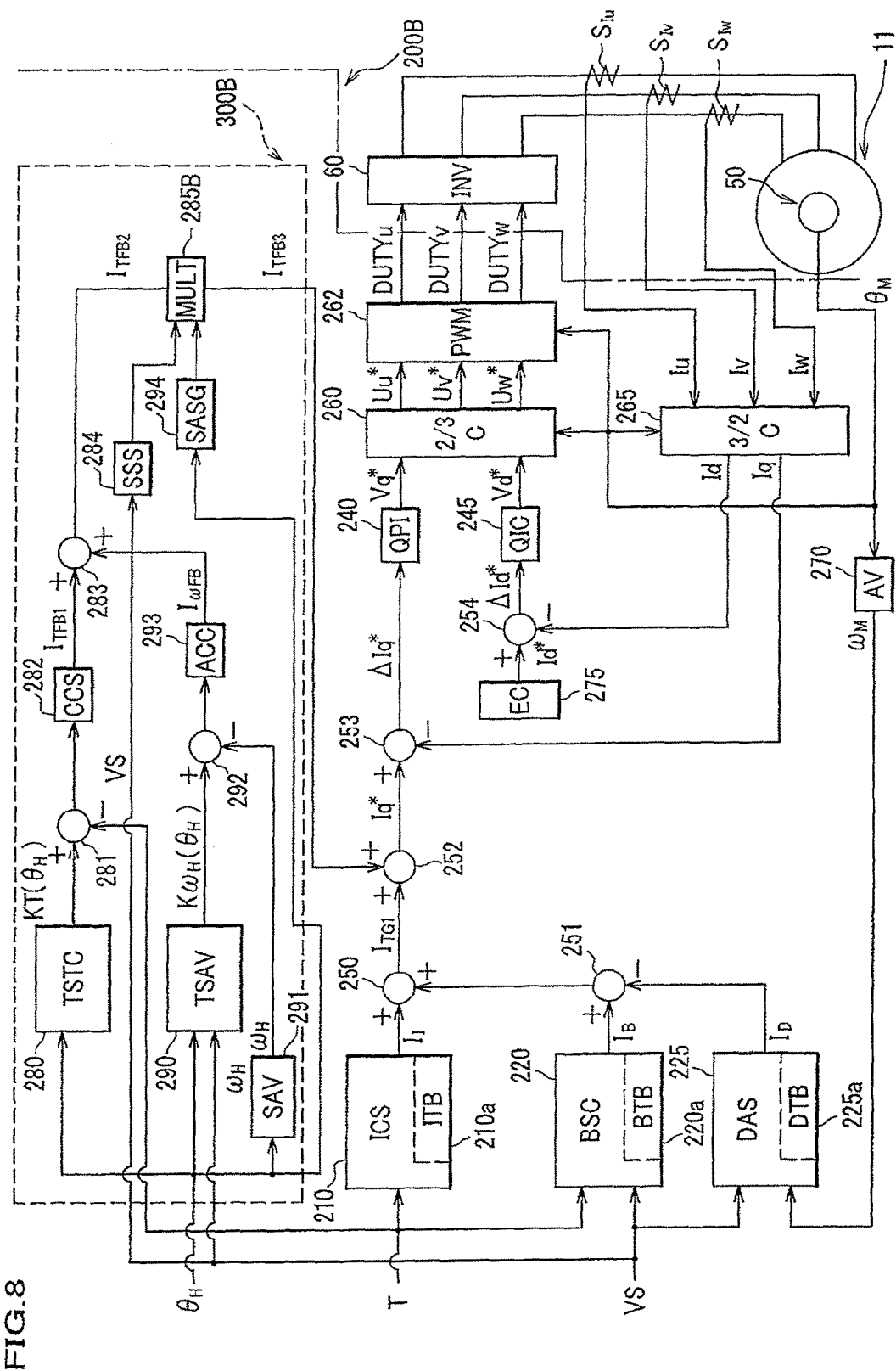
FIG. 8 shows the configuration of the function blocks of a control device in a second embodiment.

As shown in FIG. 8, the low-vehicle-speed steering-reaction-force control section 300B includes a target steering torque computation section 280, a subtractor 281, a current conversion section 282, a adder 283, a vehicle speed sensitive gain setting section (vehicle speed sensitivity adjusting means) 284, a multiplier (vehicle speed sensitivity adjusting means, steering angle sensitivity adjusting means) 285B, a target steering angular velocity computation section 290, a steering angular velocity computation section 291, a subtractor 292, an adjusting current conversion section 293, and a steering angle sensitive gain setting section (steering angle sensitivity adjusting means) 294, wherein a target current value (third target current value) ITFB3 is input to the adder 252. As described above, the q-axis target current value ITG1 output from the adder 250 is added with the target current value ITFB3 by the adder 252, and is output to the subtractor 253 as the q-axis target current value Iq*.

Differently from the first embodiment, as described above, the low-vehicle-speed steering-reaction-force control section 300B in the second embodiment additionally includes the steering angle sensitive gain setting section 294, and includes the multiplier 285B instead of a multiplier 285A.

(Steering Angle Sensitive Gain Setting Section 294, Multiplier 285B)

Figure 9:
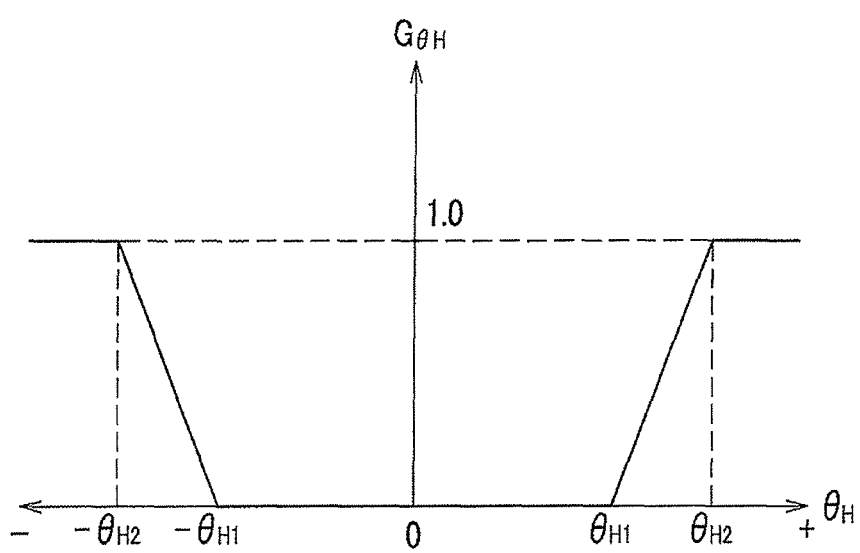
FIG. 9 illustrates a method of setting a steering angle sensitive gain by a steering angle sensitive gain setting section.

As shown in FIG. 9, corresponding to the steering angle θH, the steering angle sensitive gain setting section 294 sets a gain GθR to 0 (zero) when the absolute value of the steering angle θH on the left or right side is in a range 0 to θH1; continuously, linearly for example, increases the gain GθH when the value of the steering angle θH is in a range larger than θH1 and smaller than θH2; and sets the gain GθH to 1.0 when the value of the steering angle θH is larger than or equal to θH2.

Then, the gain GθH set by the steering angle sensitive gain setting section 294, the GTFB2 set by the vehicle speed sensitive gain setting section 284, and the adjusted target current value ITFB2 computed by the adder 283 are input to the multiplier 285B.

The multiplier 285B multiplies the adjusted target current value ITFB2 by the gain GθH and the gain GTFB2 to compute the target current value ITFB3 (ITFB3=ITFB2× GθH×GTFB2) (third target current value), and outputs to the adder 252.

The value of θH1 in the steering angle sensitive gain setting section 294 is, for example, set to the value of θH0 in FIG. 12A or a smaller value. Thus, in setting a gain GθH corresponding to the steering θH shown in FIG. 9, for example, if the absolute value of the steering angle θH increases from 0 through θH1 to θH2, the gain GθH continuously increases from 0 to reach 1.0 when the absolute value of the steering angle θH exceeds the value of θH1. Then, as the multiplier 285B multiplies the adjusted target current value ITFB2 by the gain GθH and the gain GTFB2, the target current value ITFB3 output from the multiplier 285B to the adder 252 becomes zero when the steering angle θH is smaller than or equal to θH1 or when the vehicle speed VS is in the range of the dead band shown in FIG. 4. Then, when the absolute value of the steering angle θH exceeds θH1 and the vehicle speed VS then is exceeding the dead band shown in FIG. 9, a target current value ITFB3 that is not 0 (zero) begins to be output.

In addition to the advantages of the first embodiment, according to the present embodiment, a target current value ITFB3 is not output at least unless the absolute value of the steering angle θH exceeds a predetermined value θH1. Accordingly, even in a low vehicle speed state of a vehicle having a steering mechanism with a low Ackermann ratio of for example 30 to 50%, the low-vehicle-speed steering-reaction-force control section 300B does not perform steering reaction force adjustment in a steering angle range where the steering angle vs. steering torque characteristic is the same as the steering angle vs. steering torque characteristic of a vehicle having a steering mechanism with a high Ackermann ratio. Thus, it is possible to effectively obtain a steering assisting force from the electric motor 11 in the range of the absolute value of the steering angle θH from 0 to θH1.

Further, in the range of the absolute value of the steering angle θH from 0 to θH1, the driver can feel the road surface information from the steered wheels (front wheels) 10F, 10F by a change in the steering reaction force.

((Modified Examples of Second Embodiment))

In the second embodiment, the control device 200B is configured to include the inertia compensating signal computation section 210, the base signal computation section 220, the damper adjusting signal computation section 225, the adder 250, the subtractor 251, the adder 252, the adder 283, the vehicle speed sensitive gain setting section 284, the multiplier 285B, the target steering angular velocity computation section 290, the steering angular velocity computation section 291, the subtractor 292, the adjusting current conversion section 293, and the steering angle sensitive gain setting section 294, however, the control device 200B is not limited thereto.

(First Modified Example of Second Embodiment)

A first modified example of the second embodiment will be described below.

In the present modified example, the control device 200B is configured, removing the inertia compensating signal computation section 210, the base signal computation section 220, the damper adjusting signal computation section 225, the adder 250, the subtractor 251, the adder 252, the adder 283, the vehicle speed sensitive gain setting section 284, the target steering angular velocity computation section 290, the steering angular velocity computation section 291, the subtractor 292, and the adjusting current conversion section 293.

That is, the control device 200B may be configured such that the target current value ITFB1, which is the first target current value output from the current conversion section 282, is adjusted by being multiplied by the multiplier 285B by the gain GθH output from the steering angle sensitive gain setting section 294, and thereby becomes the target current value ITFB3, which is the third target current value, and directly input to the subtractor 253.

In addition to the advantages of the first modified example of the first embodiment, according to the present modified example, the control device 200B includes the steering angle sensitive gain setting section 294 that adjusts the target current value ITFB1, which is the first target current value, at least according to a steering angle detected by the steering angle sensor 52, and outputs a result as the target current value ITFB3, which is the third target current value, and the control device 200B controls the electric motor 11 to generate a steering assisting force or a steering reaction force, based on the target current value ITFB3.

It is possible to set the steering angle sensitive gain setting section 294 such as not to output a target current value ITFB3 at least unless the steering angle θH exceeds a predetermined value (−θH1 or +θH1) on the left or right side. Accordingly, even in a low vehicle speed state of a vehicle having a steering mechanism with a low Ackermann ratio, the target current value ITFB3 is 0 in a steering angle range where the steering angle vs. steering torque characteristic is the same as the steering angle vs. steering torque characteristic of a vehicle having a steering mechanism with a high Ackermann ratio, and accordingly, a steering reaction force from the electric motor 11 can be effectively obtained in a state that the steering angle θH is exceeding the predetermined value on the left or right side.

Further, within the predetermined value range (−θH1 to +θH1) of the steering angle θH on the left or right side, the driver can feel road surface information from the steered wheels (front wheels) 10F, 10F by a change in the steering reaction force.

(Second Modified Example of Second Embodiment)

A second modified example of the second embodiment will be described below.

In the present modified example, the control device 200B is configured, removing the adder 283, the target steering angular velocity computation section 290, the steering angular velocity computation section 291, the subtractor 292, and the adjusting current conversion section 293.

That is, the control device 200B may be configured such that the target current value ITFB1, which is the first target current value output from the current conversion section 282, is multiplied by the multiplier 285B by the gain GTFB2 output from the vehicle speed sensitive gain setting section 284 to be adjusted, is also multiplied by the multiplier 285B by the gain GθH output from the steering angle sensitive gain setting section 294 to be adjusted, and thus becomes a target current value ITFB3, which is the third current value, to be input to the subtractor 253.

According to the present modified example, the target current value ITFB1 is multiplied by the multiplier 285B by the gain GTFB2 to become the second target current value, further multiplied by the gain GθH that at least corresponds to the steering angle θH detected by the steering angle sensor 52 to thereby be adjusted into the target current value ITFB3, which is the third target current value, and the target current value ITFB3 is output to the subtractor 253. Thus, the control device 200B controls the electric motor 11 to generating a steering assisting force or a steering reaction force, based on the target current value ITFB3.

Accordingly, in addition to the advantages of the first modified example of the second embodiment, the control device 200B includes the vehicle speed sensitive gain setting section 284 and the multiplier 285B that output the target current value ITFB3 obtained by adding adjustment by the gain GTFB2 to the target current value ITFB1, which is the first target current value, according to the vehicle speed VS. Thus, the control device 200B controls the electric motor 11 to generate a steering assisting force or a steering reaction force, based on the target current value ITFB3. As a result, similarly to a case of a vehicle having a steering mechanism with a high Ackermann ratio, even on a vehicle having a steering mechanism with a low Ackermann ratio, it is possible by the target current value ITFB3 output from the multiplier 285B to stably give the driver a steering feeling, even in a low vehicle speed region, such that the more the steering angle θH increases on the left or right side, the more the steering reaction force increases by the self-aligning torque.

In a medium-high vehicle speed range of the vehicle speed VS, also on a vehicle having a steering mechanism with a low Ackermann ratio, a self-aligning torque is sufficiently generated with a steering angle larger than or equal to a certain amount on the left or right side, and a steering reaction force is applied to the steering wheel 2. Accordingly, the driver does not have a feeling of strangeness even if the vehicle speed sensitive gain setting section 284 and the multiplier 285A continuously decrease the target current value ITFB3 and finally decrease the target current value ITFB3 down to 0 (zero), corresponding to the increase in the vehicle speed VS.

(Third Modified Example of Second Embodiment)

A second modified example of the second embodiment will be described below.

In the present modified example, a control device 200B is configured, removing the adder 283, the vehicle speed sensitive gain setting section 284, the target steering angular velocity computation section 290, the steering angular velocity computation section 291, the subtractor 292, and the adjusting current conversion section 293.

That is, the control device 200B may be configured such that the target current value ITFB3 output from the multiplier 285B is the third target current value obtained by adjusting the target current value ITFB1 by multiplying by the gain GθH; the q-axis target current value ITG1 output from the adder 250 and the target current value ITFB3 are added by the adder 252 to form a q-axis target current value Iq*, which is the fifth target current value; and the q-axis target current value Iq* is input to the subtractor 253.

In addition to the advantages of the first modified example of the second embodiment, according to the present example, a q-axis target current value ITG1 for which at lease the base target current value IB, which is the fourth target current value, is taken into account is input to the adder 252, and the control device 200B controls the electric motor 11 to generate a steering assisting force or a steering reaction force, based on a q-axis target current value Iq*, which is the fifth target current value as a result of adding computation of adding at least the base target current value IB to the target current value ITFB3, which is the third target current value.

As a result, similarly to a vehicle adopting an ordinary steering mechanism with a high Ackermann ratio, it is possible to control the output of a steering assisting force from the electric motor 11 by the base target current value IB, and similarly to the case of a vehicle adopting a steering mechanism with a high Ackermann ratio, even on a vehicle having a steering mechanism with a low Ackermann ratio, it is possible even in a low vehicle speed region to stably give the driver a steering feeling that the more the steering angle θH increases on the left or right side, the more the steering reaction force increases by a self-aligning torque.

(Fourth Modified Example of Second Embodiment)

A fourth modified example of the second embodiment will be described below.

In the present modified example, a control device 200B is configured, removing the adder 283, the target steering angular velocity computation section 290, the steering angular velocity computation section 291, the subtractor 292, and the adjusting current conversion section 293.

That is, the control device 200B may be arranged such that the target current value ITFB3 output from the multiplier 285B is the third target current value adjusted by multiplying the target current value ITFB1 by the gain GθH and the gain GTFB2; the target current value ITFB3 is output to the adder 252 and further added by the adder 252 to the q-axis target current value ITG1 output from the adder 250 to become a q-axis target current value Iq*, which is the fifth target current value; and is input to the subtractor 253.

In addition to the advantages of the third modified example of the second embodiment, according to the present modified example, in a medium-high vehicle speed range of the vehicle speed VS, also on a vehicle having a steering mechanism with a low Ackermann ratio, a self-aligning torque is sufficiently generated with a steering angle larger than or equal to a certain amount on the left or right side, and a steering reaction force is applied to the steering wheel 2. Accordingly, the driver does not have a feeling of strangeness even if the vehicle speed sensitive gain setting section 284 and the multiplier 285A continuously decrease the target current value ITFB3 and finally decrease the target current value ITFB3 down to 0 (zero), corresponding to the increase in the vehicle speed VS.

((Third Embodiment))

Although, in the first embodiment and the second embodiment, the target steering angular velocity computation section 290, the steering angular velocity computation section 291, the subtractor 292, the adjusting current conversion section 293, and the adder 283 configure 'variation width restricting means' described in claims, however, the invention is not limited thereto.

Figure 10:
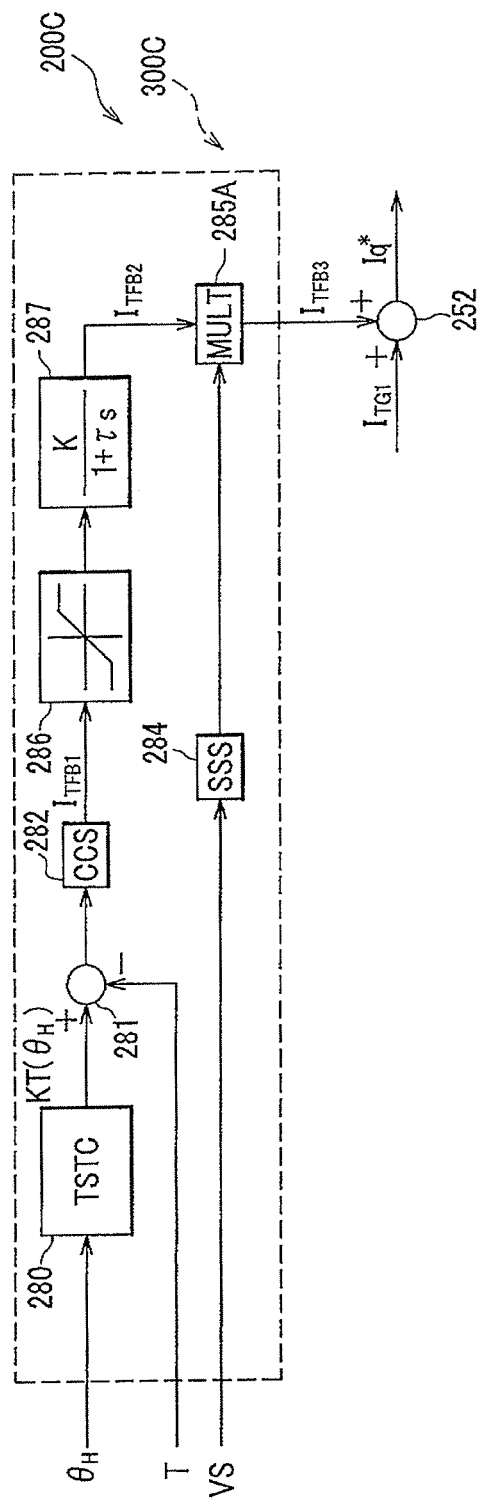
FIG. 10 shows the configuration of function blocks of the low-vehicle-speed steering-reaction force control section of a control device in a third embodiment.

Referring to FIG. 10, an example of a different configuration of variation width restricting means will be described below.

FIG. 10 shows the configuration of function blocks of the low-vehicle-speed steering-reaction force control section of a control device in the third embodiment.

The low-vehicle-speed steering-reaction-force control section 300C of a control device (motor control means) 200C, shown in FIG. 10, replaces the low-vehicle-speed steering-reaction-force control section 300A of the control device 200A, shown in FIG. 2, in the first embodiment or a modified example of the first embodiment, wherein the control device 200C is configured the same as the control device 200A in other points. The same symbols will be assigned to the same elements as those in the first embodiment or a modified example of the first embodiment, and description of overlapping elements will be omitted.

As shown in FIG. 10, the low-vehicle-speed steering-reaction-force control section 300C includes a target steering torque computation section 280, a subtractor 281, a current conversion section 282, a limiter 286, a first order delay processing section 287, a vehicle speed sensitive gain setting section 284, and a multiplier 285A, wherein a target current value (second target current value) ITFB3 output from the multiplier 285A is input to the adder 252. Then, as described above, the target current value ITFB3 is subtracted by the adder 252 from a q-axis target current value ITG1 output from the adder 250, and an q-axis target current value Iq* is output to the subtractor 253.

Herein, the limiter 286 and the first order delay processing section 287 in the present embodiment configure 'variation width reducing means' described in claims.

The limiter 286 inputs a target current value ITFB1 computed by the current conversion section 282 to the first order delay processing section 287, limiting the target current value ITFB1 to a range with certain ± limit values. The first order delay processing section 287 performs first order delay processing of the target current value ITFB1, which has been limited into a range with the upper and lower limits by the limiter 286, and inputs the smoothly adjusted target current value ITFB1 to the multiplier 285A. The multiplier 285A multiplies the target current value ITFB1 having been adjusted by the first order delay processing by a gain GTFB2 input from the vehicle speed sensitive gain setting section 284, and inputs a thus obtained target current value (second target current value) ITFB3 to the adder 252.

According to the present embodiment, even without adding an adjusted current value IωFB based on a steering angular velocity deviation value, which is the deviation between a steering angle sensitive target steering angular velocity KωH (θH) and a steering angular velocity ωH in the first embodiment or a modified example of the first embodiment, to the target current value ITFB1 computed by the current conversion section 282, it is possible to reduce significant variation in the target current value (first target current value) ITFB1 due to variation in the steering angular velocity ωH, and obtain a stable target current value ITFB3.

Although an example where the limiter 286 and the first order delay processing section 287 are applied to the first embodiment or a modified example of the first embodiment is shown in FIG. 10, the limiter 286 and the first order delay processing section 287 can also be easily applied to the second embodiment or a modified example of the second embodiment. That is, in FIG. 10, a steering angle sensitive gain setting section 294 is added; the multiplier 285A is replaced by a multiplier 285B; to which input are the adjusted smooth target current value (adjusted first target current value) ITFB2 having been subjected to the first order delay processing by the first order delay processing section 287, the gain GTFB2 from the vehicle speed sensitive gain setting section 284, and the gain GθH from the steering angle sensitive gain setting section 294; the adjusted target current value ITFB2 is multiplied by the gain GTFB2 and the gain GθH; and the thus obtained target current value (third target current value) ITFB3 is input to the adder 252.

According to the present embodiment, even without adding an adjusted current value IωFB based on a steering angular velocity deviation value, which is the deviation between a steering angle sensitive target steering angular velocity KJH (θH) and a steering angular velocity ωH in the first embodiment, the second embodiment, or a modified example of the first or second embodiment, to the target current value (first target current value) ITFB1 computed by the current conversion section 282, it is possible to reduce significant variation in the target current value ITFB1 due to variation in the steering angular velocity ωH, and obtain a stable target current value (second target current value, third target current value) ITFB3.

DESCRIPTION OF REFERENCE SYMBOLS

2 . . . steering wheel
10F . . . steered wheel
11 . . . electric motor
30 . . . steering torque sensor
35 . . . vehicle speed sensor (vehicle speed detecting means)
50 . . . resolver
52 . . . steering angle sensor
60 . . . inverter
100 . . . electronic power steering apparatus
200, 200A, 200B. 200C . . . control device (motor control means)
210 . . . inertia compensating signal computation section 220 . . . base signal computation section (second target current value computing means)
225 . . . damper adjusting signal computation section
240 . . . q-axis PI control section
245 . . . d-axis PI control section
250 . . . adder
251 . . . subtractor
252 . . . adder (adding means)
253 . . . subtractor
254 . . . subtractor
260 . . . 2-axis/3-phase conversion section
262 . . . PWM conversion section
265 . . . 3-phase/2-axis conversion section
270 . . . angular velocity computation section
275 . . . exciting current generation section
280 . . . target steering torque computation section (target steering torque setting means)
281 . . . subtractor (torque deviation computing means)
282 . . . current conversion section (first target current value computing means)
283 . . . adder (variation width reducing means, damp adding means)
284 . . . vehicle speed sensitive gain setting section (vehicle speed sensitivity adjusting means)
285A . . . multiplier (vehicle speed sensitivity adjusting means)
285B . . . multiplier (vehicle speed sensitivity adjusting means, steering angle sensitivity adjusting means)
286 . . . limiter (variation width reducing means)
287 . . . first order delay processing section (variation width reducing means)
290 . . . target steering angular velocity computation section (variation width reducing means, target steering angular velocity computing means)
291 . . . steering angular velocity computation section (variation width reducing means, steering angular velocity computing means)
292 . . . subtractor (variation width reducing means, steering angular velocity deviation computing means)
293 . . . adjusting current conversion section (variation width reducing means, third target current value computing means)
294 . . . steering angle sensitive gain setting section (steering angle sensitivity adjusting means)
300A, 300B, 300C . . . low-vehicle-speed steering-reaction-force control section
GTFB1 . . . gain
GTFB2 . . . gain
GθH . . . gain
IB . . . base target current value (fourth target current value)
ID . . . damper adjusting current value
II . . . inertia compensating current value
Iq* . . . q-axis target current value (fifth target current value)
Iq . . . q-axis real current value
Id* . . . d-axis target current value
Id . . . d-axis real current value
Iu, Iv, Iw . . . real current value
ITG1 . . . q-axis target current value
ITFB1 . . . target current value (first target current value)
ITFB2 . . . adjusted target current value
ITFB3 . . . target current value (second target current value, third target current value)
IωFB . . . adjusted current value (sixth target current value)
KωH(θH) . . . steering angle sensitive target steering angular velocity
KT(θH) . . . steering angle sensitive target steering torque
T . . . steering torque
VS . . . vehicle speed

The invention claimed is:

1. An electronic power steering apparatus that is applied to a vehicle having a steering mechanism, causes a motor to generate a steering assisting force with a motor control unit, and transmits the steering assisting force to a steering system to cause a reduction in a steering force, comprising:
a steering angle sensor for detecting a steering angle of a steering wheel;
a steering torque sensor for detecting a steering torque of the steering wheel; and
a control device including a CPU configured to provide:
a target steering torque setting unit configured to set a target steering torque on the basis of the steering angle detected by the steering angle sensor;
a torque deviation computing unit configured to compute a torque deviation between the target steering torque set by the target steering torque setting unit and the steering torque detected by the steering torque sensor;
a first target current value computing unit configured to compute a first target current value for generating a steering assisting force by the motor on the basis of the torque deviation computed by the torque deviation computing unit; and
a vehicle speed sensitivity adjusting unit that outputs the adjusted first current value as a second target current value,
wherein the motor control unit controls the motor to generate the steering assisting force on the basis of the second target current value;
wherein the steering mechanism has a low ackermann ratio, which is in a range of 0 to 50%,
wherein in a state that the steering assisting force is not applied to the steering system, the steering reaction force from the steering mechanism decreases as the steering angle increases while the vehicle speed is not greater than 30 km/h, and
wherein the vehicle speed sensitivity adjusting unit adjusts the first target current value, at least corresponding to a vehicle speed detected by a vehicle speed detecting unit such that a steering reaction force on the steering wheel of the vehicle normally increases as the steering angle increases while the vehicle speed is not greater than 30 km/h.

2. The electronic power steering apparatus according to claim 1,
wherein the CPU is further configured to provide a steering angle sensitivity adjusting unit that adjusts the second target current value in accordance with, at least, the steering angle detected by the steering angle sensor to output the adjusted second target current value as a third target current value, and
wherein the motor control unit controls the motor to generate the steering assisting force on the basis of the third target current value instead of the second target current value.

3. The electronic power steering apparatus according to claim 2,
wherein the CPU is further configured to provide:
a second target current value computing unit configured to compute a fourth target current value for generating the steering assisting force in accordance with, at least, the steering torque detected by the steering torque sensor; and an adding unit that adds the third target current value to the fourth target current value to output a fifth target current value, wherein the motor control unit controls the motor to generate the steering assisting force on the basis of the fifth target current value instead of the third target current value.

4. The electronic power steering apparatus according to claim 1, wherein the CPU is further configured to provide:

a second target current value computing unit configured to compute a fourth target current value for generating the steering assisting force in accordance with, at least the steering torque detected by the steering torque sensor; and an adding unit that adds the second target current value to the fourth target current value to output a fifth target current value, wherein the motor control unit controls the motor to generate the steering assisting force on the basis of the fifth target current value instead of the second target current value.

5. The electronic power steering apparatus according to claim 1, wherein the CPU is further configured to provide a variation width reducing unit configured to damp a vibration variation width of the first target current value.

6. The electronic power steering apparatus according to claim 5, wherein the variation width reducing unit comprises:

a steering angular velocity computing unit configured to compute a steering angular velocity by temporally differentiating the steering angle detected by the steering angle sensor;

a target steering angular velocity computing unit configured to compute a target steering singular velocity, at least based on the steering angle detected by the steering angle sensor;

a steering angular velocity deviation computing unit configured to compute a steering angular velocity deviation between the target steering angular velocity computed by the target steering angular velocity computing unit and the steering angular velocity computed by the steering angular velocity computing unit;

a third target current value computing unit configured to compute a sixth target current value on the basis of the computed steering angular velocity deviation; and a damp adding unit that performs damping processing of the vibration variation width by adding the sixth target current value to the first target current value, and inputs a result of the damping processing to the adding unit.

7. The electronic power steering apparatus according to claim 5, wherein the variation width reducing unit performs damping processing of the vibration variation width by performing filtering processing of the first target current value with a certain time constant.

8. The electronic power steering apparatus according to claim 1, wherein the steering mechanism has a low ackermann ratio, which is in a range of 0 to 30%.

9. The electronic power steering apparatus according to claim 1, wherein the steering reaction force on the steering wheel includes the steering assisting force and the steering reaction force from the steering mechanism.

* * * * *